(12) United States Patent
Willman

(10) Patent No.: US 8,848,887 B2
(45) Date of Patent: Sep. 30, 2014

(54) JURISDICTIONALLY OPTIMIZED CALL ROUTING

(75) Inventor: John G. Willman, Norfolk, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1191 days.

(21) Appl. No.: 12/395,073

(22) Filed: Feb. 27, 2009

(65) Prior Publication Data

US 2010/0220852 A1 Sep. 2, 2010

(51) Int. Cl.
*H04M 15/00* (2006.01)
*H04Q 3/00* (2006.01)
*H04Q 3/66* (2006.01)
*H04L 12/66* (2006.01)

(52) U.S. Cl.
CPC ............... *H04Q 3/66* (2013.01); *H04M 15/80* (2013.01); *H04Q 2213/13141* (2013.01); *H04Q 2213/13138* (2013.01); *H04Q 2213/13144* (2013.01); *H04M 15/8044* (2013.01); *H04Q 3/0029* (2013.01); *H04M 2215/016* (2013.01); *H04M 15/00* (2013.01); *H04M 15/90* (2013.01); *H04M 2215/74* (2013.01); *H04M 2215/745* (2013.01); *H04Q 2213/13148* (2013.01); *H04Q 2213/13353* (2013.01)
USPC .................... 379/114.01; 370/352; 370/354

(58) Field of Classification Search
USPC ............... 455/422.1, 445, 453; 370/352, 353, 370/354, 35, 356, 357; 379/201.01, 221, 379/272, 273, 112.05, 114, 115, 121
See application file for complete search history.

(56) References Cited

U.S. PATENT DOCUMENTS

| | | | | |
|---|---|---|---|---|
| 5,452,350 | A * | 9/1995 | Reynolds et al. | 379/221.07 |
| 5,799,071 | A * | 8/1998 | Azar et al. | 379/114.02 |
| 5,862,203 | A * | 1/1999 | Wulkan et al. | 379/114.02 |
| 6,169,791 | B1 * | 1/2001 | Pokress | 379/114.02 |
| 6,295,350 | B1 * | 9/2001 | Schreyer et al. | 379/221.01 |
| 6,381,315 | B1 * | 4/2002 | Nhaissi | 379/111 |
| 6,961,334 | B1 * | 11/2005 | Kaczmarczyk | 370/354 |
| 2003/0076816 | A1 * | 4/2003 | Naranjo et al. | 370/352 |
| 2005/0094623 | A1 * | 5/2005 | D'Eletto | 370/352 |
| 2005/0163110 | A1 * | 7/2005 | Howell | 370/352 |
| 2005/0271192 | A1 * | 12/2005 | Kearns et al. | 379/112.01 |
| 2007/0115947 | A1 * | 5/2007 | Nelson et al. | 370/356 |
| 2007/0248077 | A1 * | 10/2007 | Mahle et al. | 370/352 |
| 2008/0198998 | A1 * | 8/2008 | Aleynikov | 379/221.01 |
| 2009/0010418 | A1 * | 1/2009 | Long et al. | 379/221.02 |
| 2011/0122827 | A1 * | 5/2011 | Bjorsell et al. | 370/328 |

* cited by examiner

*Primary Examiner* — Khai N Nguyen
*Assistant Examiner* — Kharye Pope

(57) ABSTRACT

A device receives ordered call routing lists, receives information about a call, from an originating location, to a terminating location of a network, and determines a jurisdictional index for the call based on the originating and terminating locations and based on jurisdiction definitions of carriers associated with the network. The device also selects a route list from the ordered call routing lists based on the determined jurisdictional index and based on the terminating location, selects a route from the selected route list, and provides routing instructions to network elements associated with the selected route, where the call is routed to the terminating location via the selected route and based on the routing instructions.

25 Claims, 20 Drawing Sheets

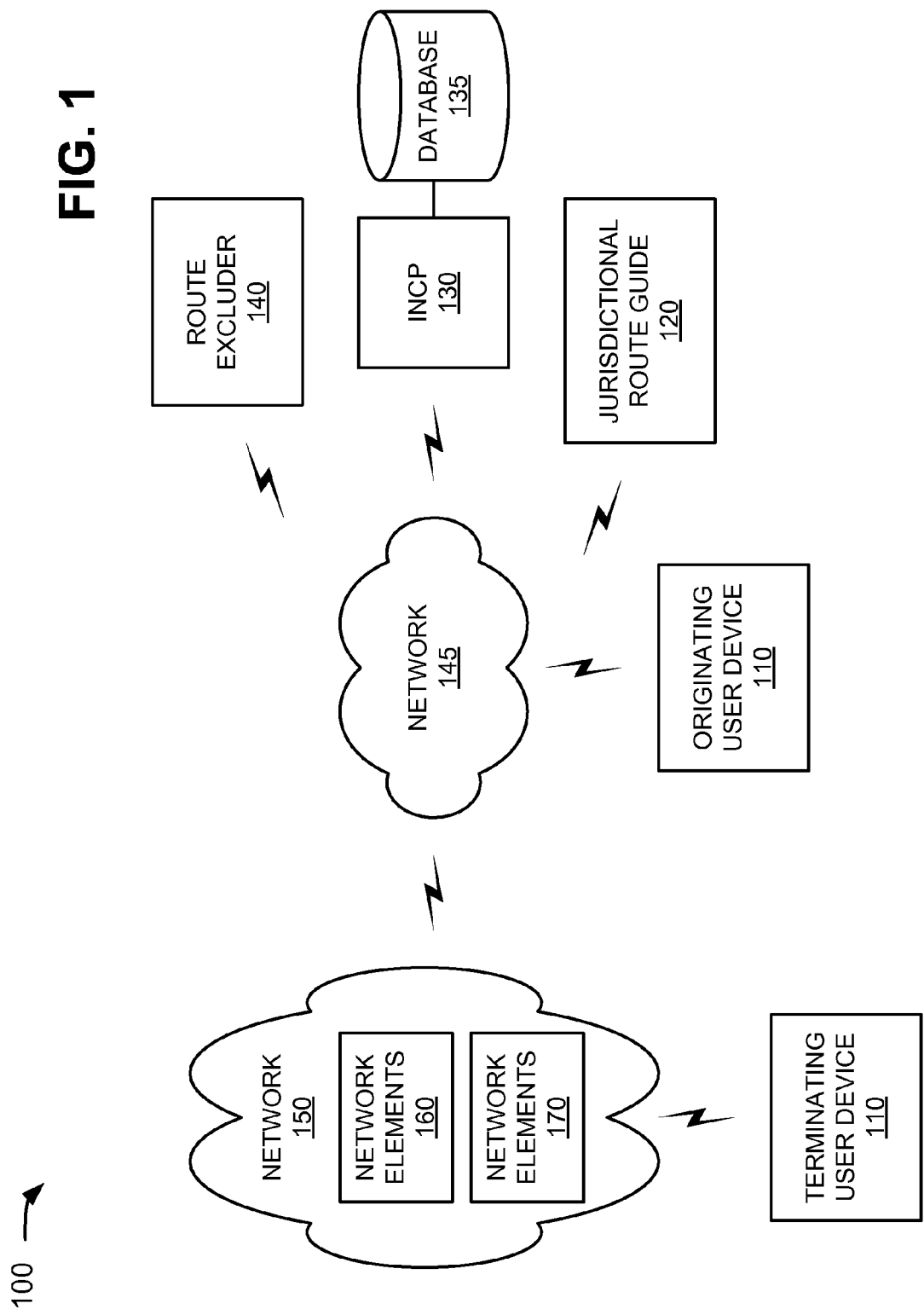

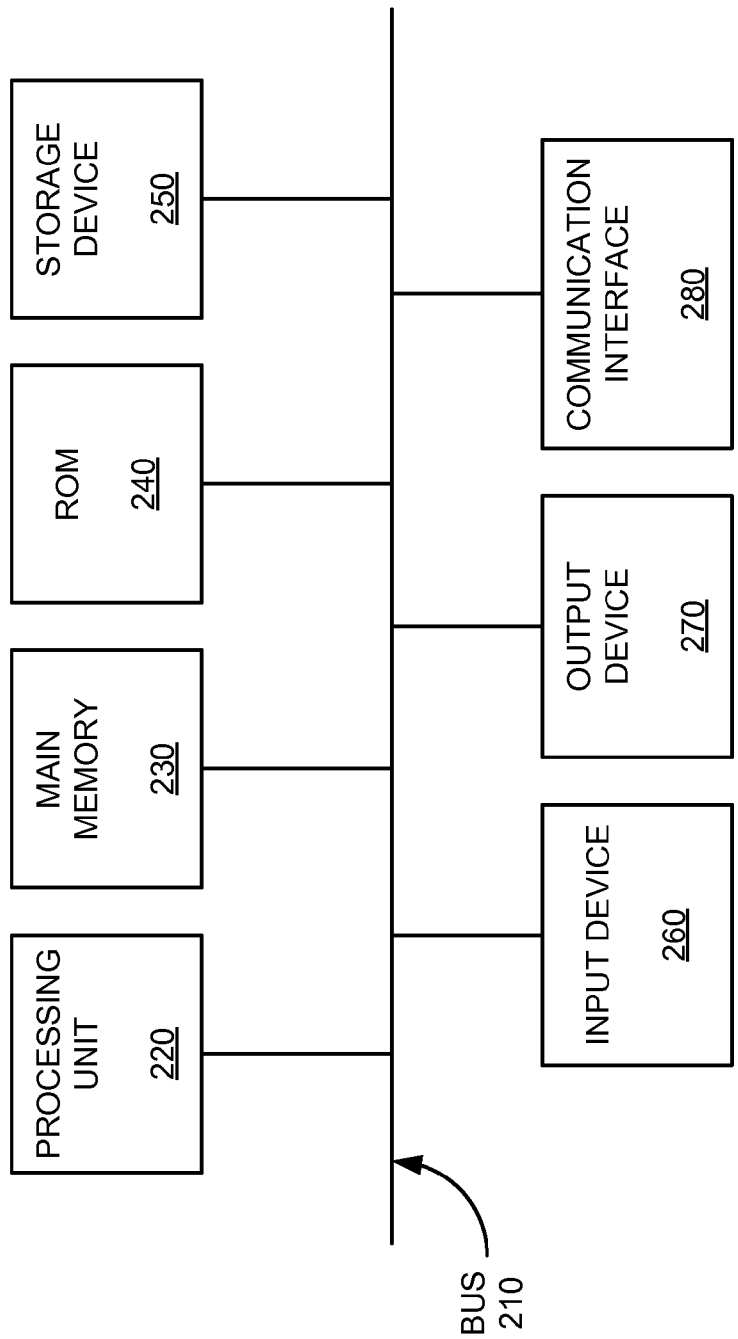

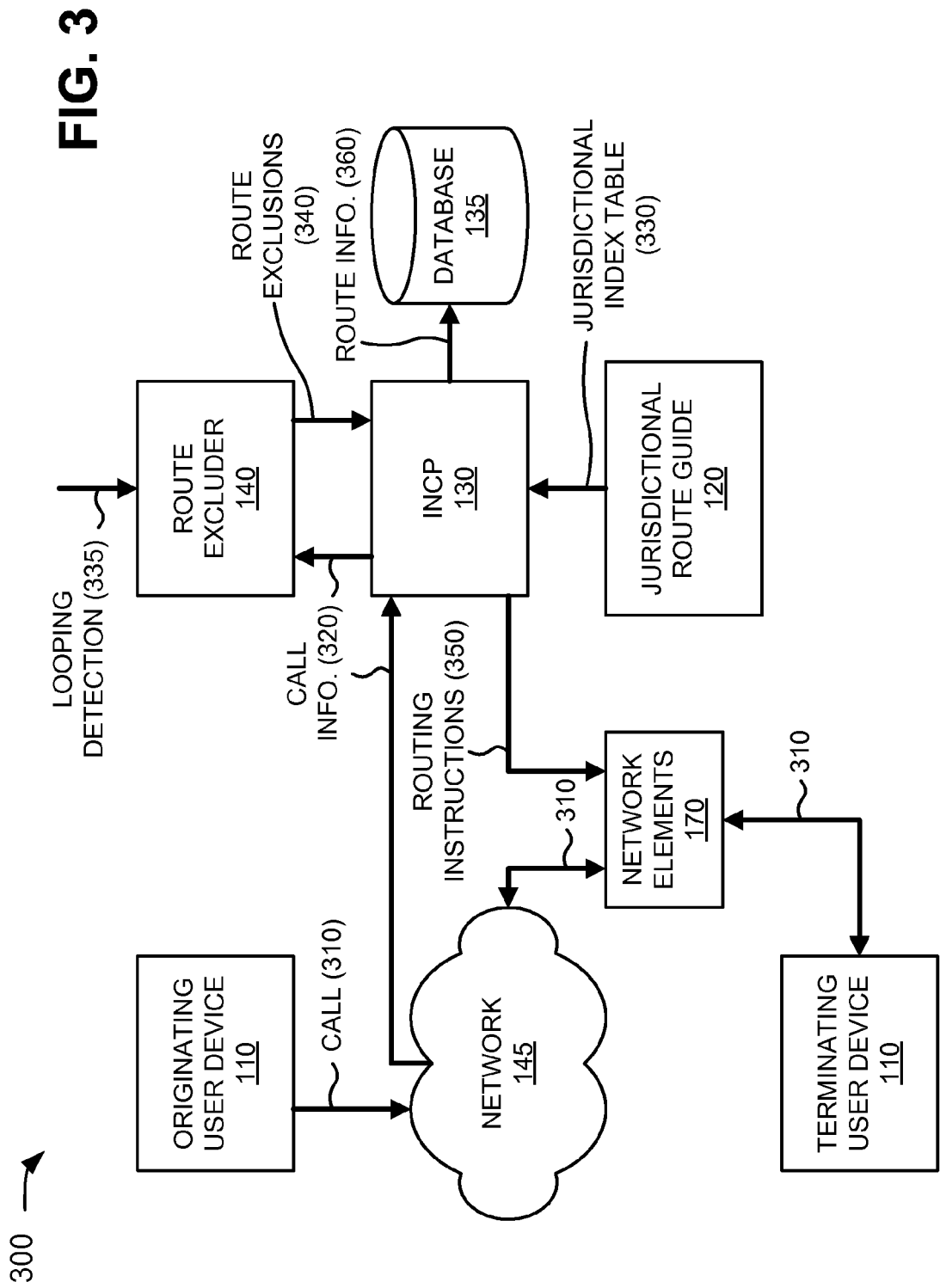

FIG. 4

| Carrier | First Definition | Second Definition | Third Definition | Last Definition |
|---|---|---|---|---|
| Carrier1 | Charge Number | Calling Party Number | None | Unmarked, location of ingress POP |
| Carrier2 | Charge Number | Calling Party Number | None | Unmarked, location of ingress POP |
| Carrier3 | JIP if mobile originated call | ANI | Calling Party Number | Unmarked, PIU method |
| Carrier4 | Calling Party Number | None | None | Unmarked, PIU method |
| On-Net1 | JIP if mobile originated call | ANI | None | Unmarked, PIU method |
| On-Net2 | ANI | None | None | Unmarked, PIU method |

| Jurisdictional Index | Carrier1 | Carrier2 | Carrier3 | Carrier4 | On-Net1 | On-Net2 |
|---|---|---|---|---|---|---|
| 1 | 0 | 0 | 0 | 0 | 0 | 0 |
| 2 | 0 | 0 | 1 | 0 | 0 | 1 |
| 3 | 0 | 1 | 0 | 0 | 1 | 2 |
| 4 | 0 | 1 | 1 | 1 | 1 | 0 |
| 5 | 1 | 0 | 0 | 1 | 0 | 1 |
| ... | ... | ... | ... | ... | ... | ... |
| 32 | 1 | 1 | 1 | 1 | 1 | 1 |
| ... | ... | ... | ... | ... | ... | ... |
| N-1 | 1 | 1 | 0 | 2 | 1 | 1 |
| N | 1 | 1 | 1 | 2 | 1 | 2 |

FIG. 7

| EO-CLLI 710 | OCN 720 | EO-OCN Enable 730 | Juri Index 740 | Rate Type 750 | Rate Type Code 760 | Rate 770 |
|---|---|---|---|---|---|---|
| ABCD1234 | 7076 | 1 | 1 | Intrastate | 0 | 0.175000 |
| ABCD1234 | 7076 | 1 | 2 | Intrastate | 0 | 0.175000 |
| ABCD1234 | 7076 | 1 | ⋮ | | | |
| ABCD1234 | 7076 | 1 | 32 | Interstate | 1 | 0.004200 |
| ABCD1234 | 7076 | 1 | ⋮ | | | |
| ABCD1234 | 7076 | 1 | N-1 | Unmarked | 2 | 0.134400 |
| ABCD1234 | 7076 | 1 | N | Unmarked | 2 | 0.134400 |
| BCDE4567 | 1357 | 1 | 1 | Intrastate | 0 | 0.251500 |
| BCDE4567 | 1357 | 1 | 2 | Intrastate | 0 | 0.251500 |
| BCDE4567 | 1357 | 1 | ⋮ | | | |
| BCDE4567 | 1357 | 1 | 32 | Interstate | 1 | 0.006750 |
| BCDE4567 | 1357 | 1 | ⋮ | | | |
| BCDE4567 | 1357 | 1 | N-1 | Unmarked | 2 | 0.206600 |
| BCDE4567 | 1357 | 1 | N | Unmarked | 2 | 0.206600 |

| EO-CLLI | OCN | Juri Index | Route Choice | Switch ID | Carrier |
|---|---|---|---|---|---|
| ABCD1234 | 7076 | 2 | 1 | 123 | Carrier2 |
| ABCD1234 | 7076 | 2 | 2 | 123 | Carrier4 |
| ABCD1234 | 7076 | 2 | 3 | 123 | Carrier3 |
| ABCD1234 | 7076 | 2 | 4 | 123 | Carrier1 |
| ABCD1234 | 7076 | 2 | 5 | 123 | On-Net1 |

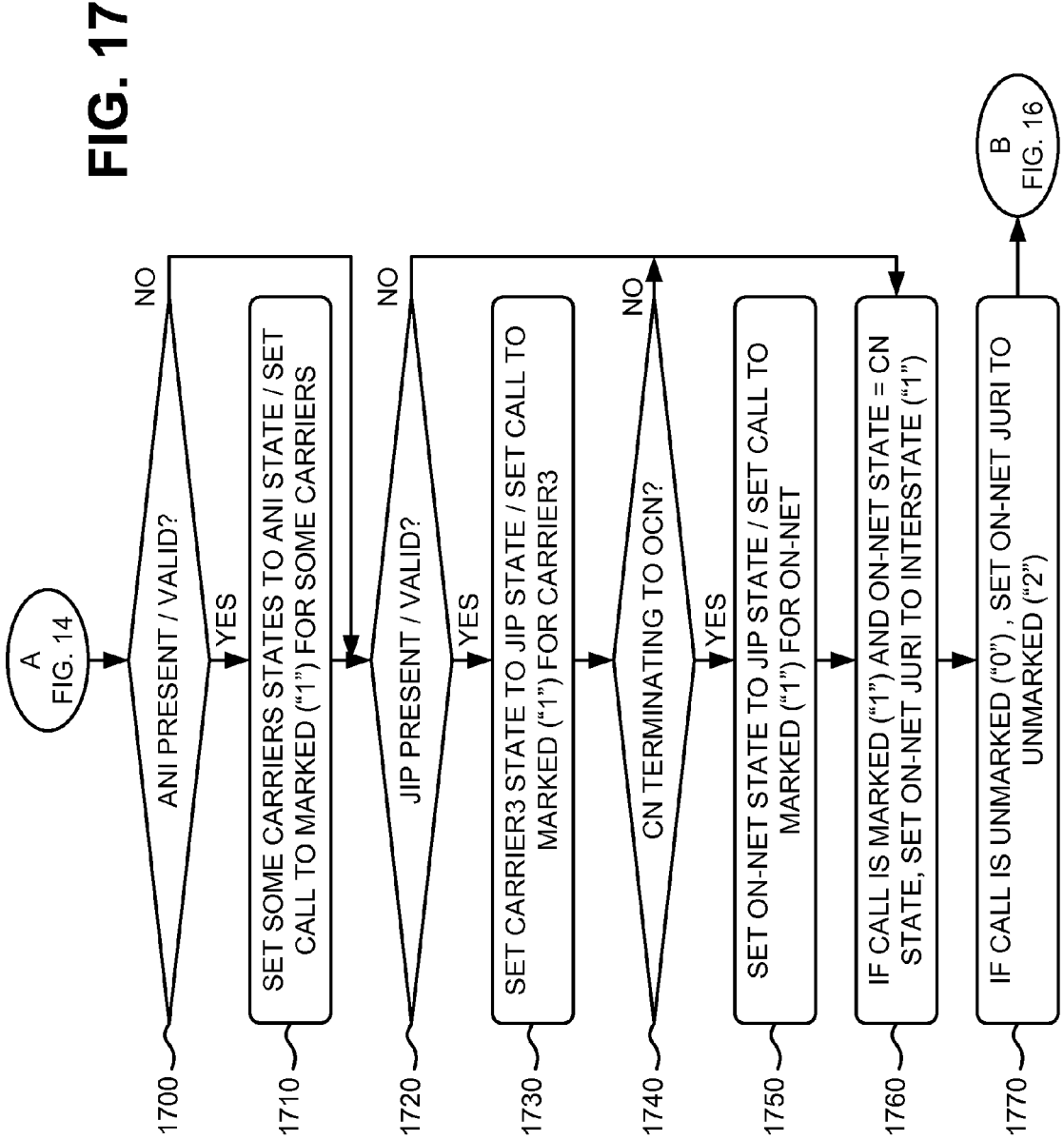

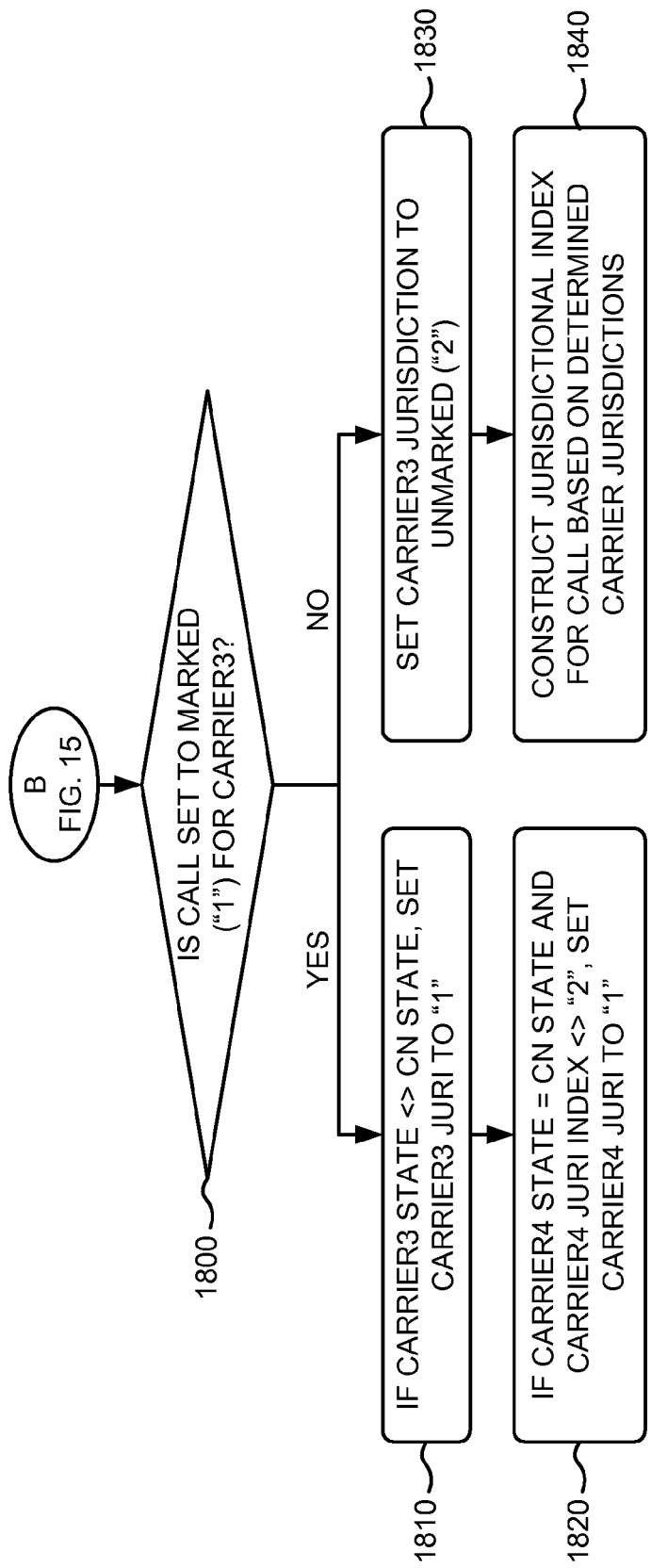

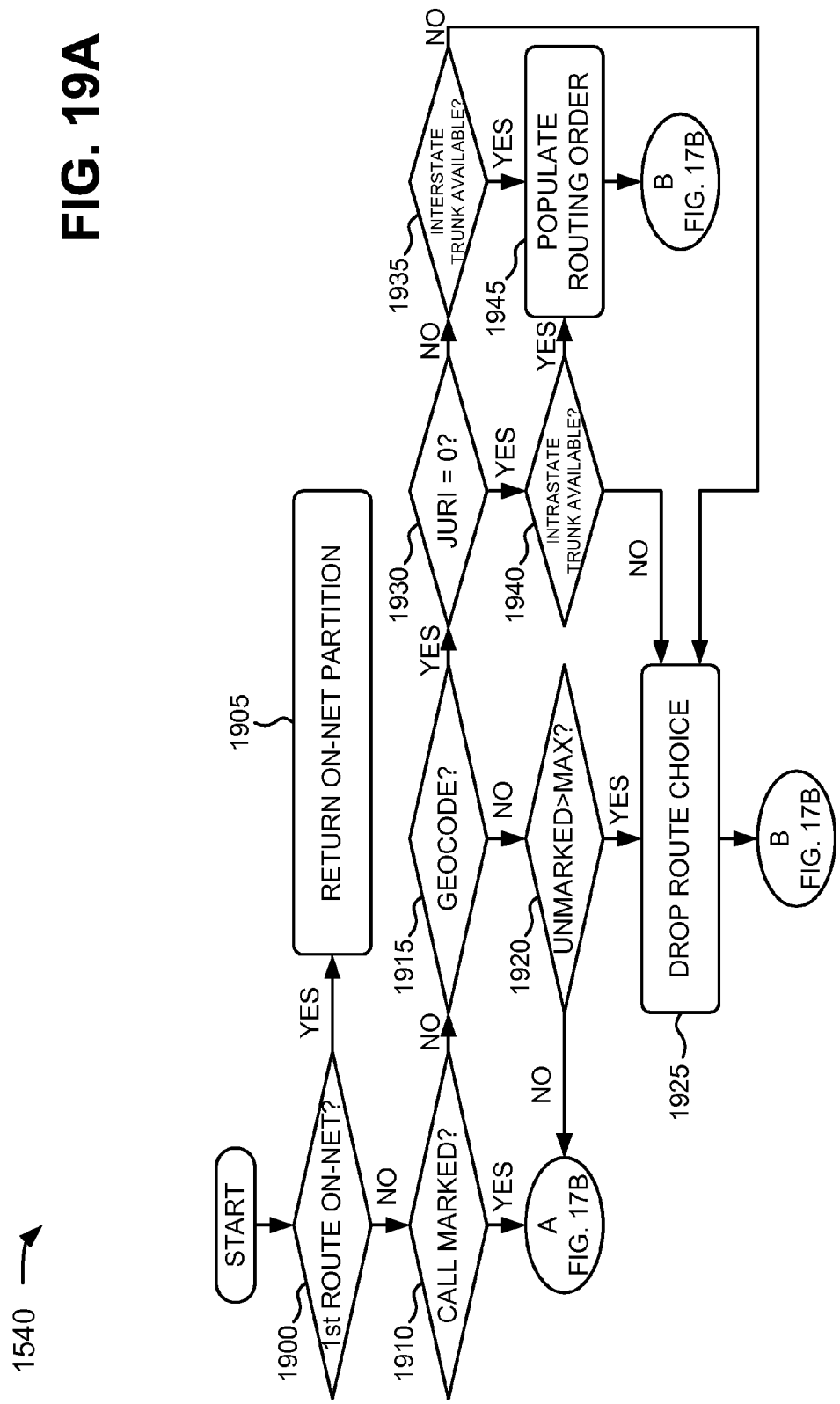

US 8,848,887 B2

JURISDICTIONALLY OPTIMIZED CALL ROUTING

BACKGROUND

Some telecommunications systems (e.g., the public switched telephone network (PSTN) use Signaling System 7 (SS7) standards for communication of telephone calls. SS7 is a digital communications protocol that supports various messaging and call information features that facilitate a variety of telephone services. SS7 facilitates advanced intelligent network (AIN) call processing, such as call handling instructions obtained by a switch from a service control point (SCP). The SCP may include logic (e.g., call processing records) used to provide a switch with specific call processing instructions based on information obtained from a database and/or call information provided by the switch or another source.

Different carriers may own and/or manage different portions of a telecommunications network (e.g., different switches, trunks, etc.). When a particular carrier receives a call to a terminating location (e.g., a destination), the particular carrier determines a route through the telecommunications network to the terminating location. The route may traverse portions of the telecommunications network that are owned by other carriers, and the other carriers may charge a fee, to the particular carrier, for use of their portions of the telecommunications network. For example, based on certain definitions of the originating and terminating locations of the call, the other carriers may determine a jurisdiction for the call (e.g., that the call is an intrastate call or an interstate call) and may charge a fee based on the determined jurisdiction. However, the other carriers may use different criteria to determine jurisdictions for calls. Furthermore, the other carriers may charge different fees for intrastate calls and interstate calls (e.g., the fees for intrastate calls may be more expensive than the fees for interstate calls).

BRIEF DESCRIPTION OF THE DRAWINGS

FIG. 1 is a diagram of an exemplary network in which systems and methods described herein may be implemented;

FIG. 2 illustrates exemplary components of a jurisdictional route guide, an intelligent call processing platform (INCP), and/or a route excluder of the network depicted in FIG. 1;

FIG. 3 depicts a diagram of exemplary interactions among components of an exemplary portion of the network illustrated in FIG. 1;

FIG. 4 illustrates a diagram of an exemplary portion of a carrier call origination definition table;

FIG. 6 illustrates a diagram of an exemplary portion of a jurisdictional index table capable of being generated and/or maintained by the jurisdictional route guide depicted in FIG. 5;

FIG. 7 depicts a diagram of exemplary portion of carrier rate tables capable of being generated and/or maintained by the jurisdictional route guide illustrated in FIG. 5;

FIG. 8 illustrates a diagram of an exemplary portion of a jurisdictional index table capable of being generated and/or maintained by the jurisdictional route guide depicted in FIG. 5;

FIGS. 15-19B depict flow charts of an exemplary process for jurisdictionally optimized call routing according to implementations described herein.

DETAILED DESCRIPTION OF PREFERRED EMBODIMENTS

Figure 5:
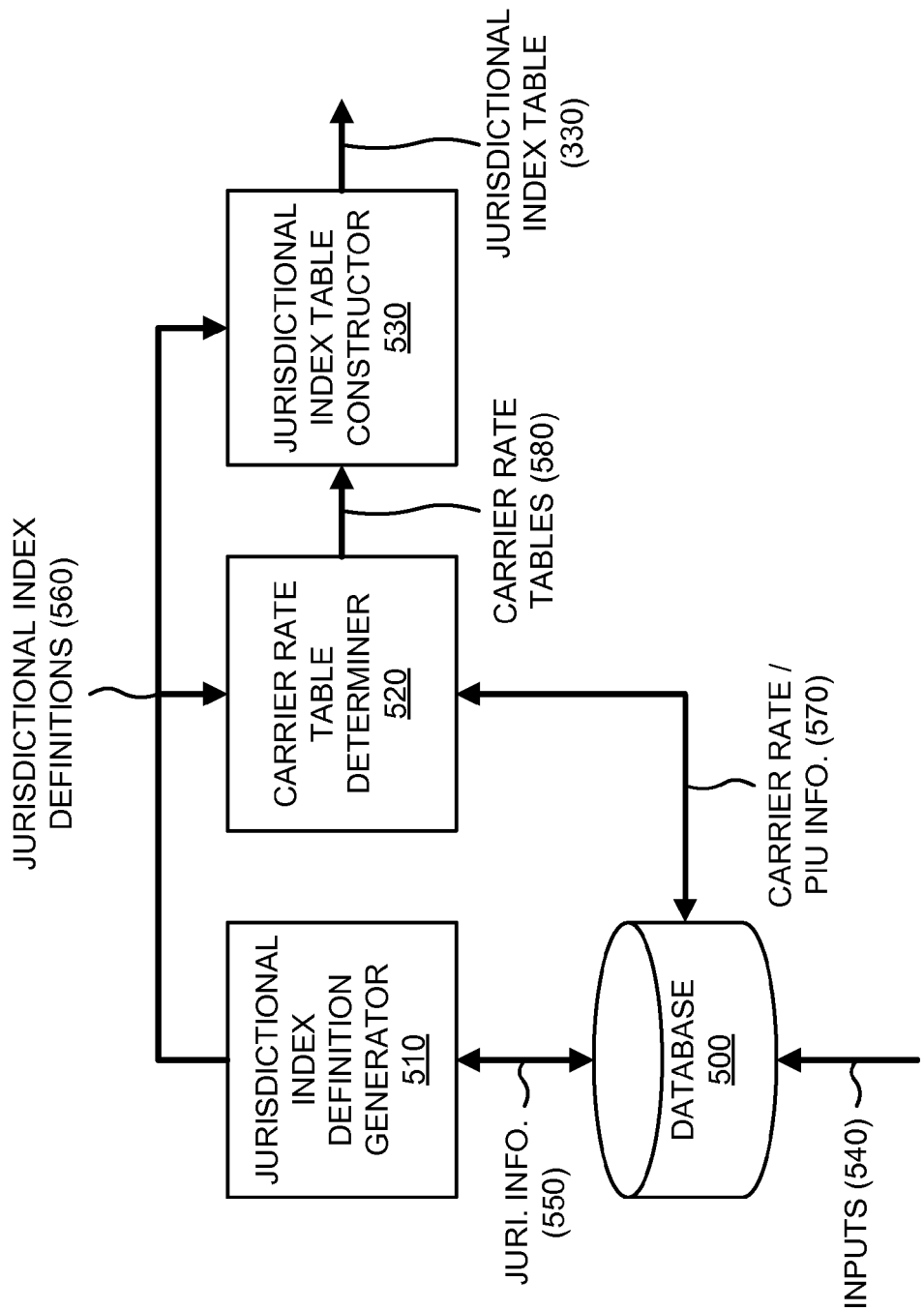
FIG. 5 depicts a diagram of exemplary functional components of the jurisdictional route guide illustrated in FIG. 1.

The following detailed description refers to the accompanying drawings. The same reference numbers in different drawings may identify the same or similar elements. Also, the following detailed description does not limit the invention.

Systems and/or methods described herein may provide jurisdictionally optimized call routing in a least expensive manner. For example, in one implementation, the systems and/or methods may receive ordered call routing lists from a jurisdictional route guide, and may receive information above a call, from an originating location, to a terminating location. The systems and/or methods may determine a jurisdictional index for the call based on the originating and terminating locations and based on jurisdiction definitions of carriers associated with the network, and may select a route list for the call from the ordered call routing lists based on the jurisdictional index and destination. The systems and/or methods may select a first route from the route list, and may determine if the selected route is viable (e.g., available, not excluded, etc.). If the selected route is not viable, the systems and/or methods may select a next route from the route list. If the selected route is viable, the systems and/or methods may provide routing instructions to network elements in the selected route, may route the call to the terminating location, via the selected route based on the routing instructions, and may store information associated with the selected route.

As used herein, the terms "caller," "calling party," and/or "user" may be used interchangeably. Also, the terms "caller," "calling party," and/or "user" are intended to be broadly interpreted to include a user device or a user of a user device.

As used herein the term "carrier" is intended to broadly interpreted to include an entity that owns, manages, and/or operates one or more portions of a telecommunications network, routes calls through the telecommunications network, and/or charges fees for use of the one or portions of the telecommunications network that they own, manage, and/or operate.

FIG. 1 is a diagram of an exemplary network 100 in which systems and methods described herein may be implemented. As illustrated, network 100 may include an originating user device 110, a terminating user device 110, a jurisdictional route guide 120, an intelligent call processing platform (INCP) 130 (with an interconnected database 135), and a route excluder 140 interconnected by networks 145 and/or 150. Network 150 may include a first set of network elements 160 and a second set of network elements 170. Originating user device 110, terminating user device 110, jurisdictional route guide 120, INCP 130, and route excluder 140 may connect to network 150 via wired and/or wireless connections. Originating user device 110 may not be connected directly to network 145, but may be connected to network 145 via an intervening network or networks.

A single originating user device 110, terminating user device 110, jurisdictional route guide 120, INCP 130, database 135, and route excluder 140 have been illustrated in FIG. 1 for simplicity. In practice, there may be more or fewer originating user devices 110, terminating user devices 110, jurisdictional route guides 120, INCPs 130, databases 135, route excluders 140, and/or networks 150. Also, in some instances, one or more of originating user device 110, terminating user device 110, jurisdictional route guide 120, INCP 130, and route excluder 140 may perform one or more functions described as being performed by another one or more of originating user device 110, terminating user device 110, jurisdictional route guide 120, INCP 130, and route excluder 140.

Each of user devices 110 may include a Plain Old Telephone Service (POTS) telephone, a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), or other types of computation or communication devices, threads or processes running on these devices, and/or objects executable by these devices. In one implementation, originating user device 110 may include a PSTN-based calling device that is capable of initiating a call to terminating user device 110.

Jurisdictional route guide 120 may include one or more servers, or other types of computation or communication devices, that gather, process, search, and/or provide information in a manner described herein. In one implementation, jurisdictional route guide 120 may include a server (e.g., a computer system) capable of generating and/or maintaining ordered call routing lists that are ordered based on jurisdictional information (e.g., whether a call is an intrastate call, an interstate call, an unmarked call, etc.). Jurisdictional route guide 120 may generate a jurisdictional index definition table (e.g., described below in connection with FIG. 6) for carriers associated with a network (e.g., carriers owning and/or managing equipment in network 100) based on criteria used by the carriers to determine jurisdictions for calls. Jurisdictional route guide 120 may generate a carrier rate table (e.g., described below in connection with FIG. 7) for each carrier based on end office common language location identifier (EO-CLLI) codes or other definitions of destination, jurisdiction, and/or rates charged by the carriers. Jurisdictional route guide 120 may look up rates in the carrier rate tables, may sort carriers based on the rates, and may construct the ordered call routing lists based on the sorted carriers and jurisdictional index. Jurisdictional route guide 120 may provide the ordered call routing lists to INCP 130. Further details of jurisdictional route guide 120 are provided below in connection with, for example, FIG. 5.

INCP 130 may include one or more servers, or other types of computation or communication devices, that gather, process, search, and/or provide information in a manner described herein. In one implementation, INCP 130 may include a server (e.g., a computer system) capable of optimally routing calls in a least expensive manner and based on jurisdictional information. INCP 130 may receive the ordered call routing lists from jurisdictional route guide 120, and may receive, from originating user device 110, a call to terminating user device 110. INCP 130 may determine a jurisdictional index for the call based on the call information actually present for each evaluated call which represents the locations of originating and terminating user devices 110, and may select a route list for the call from the ordered call routing lists based on the jurisdictional index and call destination. INCP 130 may select a first route from the route list, and may determine if the selected route is viable (e.g., available, not excluded, etc.). If the selected route is not viable, INCP 130 may select a next route from the route list. If the selected route is viable, INCP 130 may provide routing instructions to network elements (e.g., network elements 170) in the selected route, may route the call to terminating user device 110 via the selected route and based on the routing instructions, and may store information associated with the selected route (e.g., in database 135). Further details of INCP 130 are provided below in connection with, for example, FIGS. 9-11.

Database 135 may include a storage device that may store information received by INCP 130. In one implementation, database 135 may store information described below in connection with, for example, FIG. 8. For example, database 135 may store the ordered call routing lists received from jurisdictional route guide 120, information associated with call routing, information associated with jurisdictionally-based call routing, etc. Although FIG. 1 shows database 135 as separate from INCP 130, in other implementations, database 135 may be incorporated in INCP 130.

Route excluder 140 may include one or more server entities, or other types of computation or communication devices, that gather, process, search, and/or provide information in a manner described herein. In one implementation, route excluder 140 may include a server (e.g., a computer system) capable of excluding routes for calls (e.g., routed by INCP 130) based on a variety of factors. For example, route excluder 140 may determine that a call (e.g., received by INCP 130) is to be excluded from jurisdictional-based routing, from routing that creates a "looping" condition (e.g., a condition that occurs when a call continuously cycles between switches or networks and does not successfully reach its destination typically due to routing errors or lack of coordination between switches or networks), etc. Route excluder 140 may provide the determined route exclusions to INCP 130, and INCP 130 may exclude the specified routes when determining a route for a call. Further details of route excluder 140 are provided below in connection with, for example, FIG. 14.

Network 145 may include a Public Land Mobile Network (PLMN), a telephone network, such as the Public Switched Telephone Network (PSTN) or a cellular telephone network (e.g., wireless global system for mobile communications (GSM), wireless code division multiple access (CDMA), etc.), a local area network (LAN), a wide area network (WAN), a metropolitan area network (MAN), an intranet, the Internet, an IP-based network, a VoIP-based network, or a combination of networks. In one implementation, network 145 may be owned and/or managed by the same entity that owns and/or manages INCP 130.

Network 150 may include a PLMN, a telephone network, such as the PSTN or a cellular telephone network (e.g., wireless GSM, wireless CDMA, etc.), a LAN, a WAN, a MAN, an intranet, the Internet, an IP-based network, a VoIP-based network, or a combination of networks. In one implementation, network 150 may be owned and/or managed by one or more carriers (e.g., entities that are different from the entity that owns and/or manages INCP 130).

Network elements 160 may include one or more data transfer devices, such as gateways, routers, switches, firewalls, network interface cards (NICs), hubs, bridges, proxy servers, optical add-drop multiplexers (OADMs), line access multiplexers (LAMs), permanent or private virtual circuits (PVCs), links (e.g., trunks) provided between any of the aforementioned devices, or some other types of devices that process and/or transfer data. In one implementation, network elements 160 may be capable of establishing an end-to-end path between components of network 100 (e.g., between originating user device 110 and terminating user device 110). In one example, network elements 160 may be owned and/or managed by a particular carrier.

Network elements 170 may include one or more data transfer devices, such as gateways, routers, switches, firewalls, NICs, hubs, bridges, proxy servers, OADMs, LAMs, PVCs, links (e.g., trunks) provided between any of the aforementioned devices, or some other types of devices that process and/or transfer data. In one implementation, network elements 170 may be capable of establishing an end-to-end path between components of network 100 (e.g., between originating user device 110 and terminating user device 110). In one example, network elements 170 may be owned and/or managed by a particular carrier that is different than the carrier that owns and/or manages network elements 160.

FIG. 2 is an exemplary diagram of a device 200 that may correspond to any of jurisdictional route guide 120, INCP 130, and/or route excluder 140. As illustrated, device 200 may include a bus 210, a processing unit 220, a main memory 230, a read-only memory (ROM) 240, a storage device 250, an input device 260, an output device 270, and/or a communication interface 280. Bus 210 may include a path that permits communication among the components of device 200.

Processing unit 220 may include one or more processors, microprocessors, or other types of processing devices that may interpret and execute instructions. Main memory 230 may include one or more random access memories (RAMs) or another type of dynamic storage device that may store information and instructions for execution by processing unit 220. ROM 240 may include one or more ROM devices or another type of static storage device that may store static information and/or instructions for use by processing unit 220. Storage device 250 may include one or more magnetic and/or optical recording media and their corresponding drives.

Input device 260 may include one or more mechanisms that permit an operator to input information to device 200, such as a keyboard, a mouse, a pen, a microphone, voice recognition and/or biometric mechanisms, etc. Output device 270 may include one or more mechanisms that output information to the operator, including a display, a printer, a speaker, etc. Communication interface 280 may include any transceiver-like mechanisms that enable device 200 to communicate with other devices and/or systems. For example, communication interface 280 may include mechanisms for communicating with another device or system via a network, such as network 150.

As described herein, device 200 may perform certain operations in response to processing unit 220 executing software instructions contained in a computer-readable medium, such as main memory 230. A computer-readable medium may be defined as a physical or logical memory device. A logical memory device may include memory space within a single physical memory device or spread across multiple physical memory devices. The software instructions may be read into main memory 230 from another computer-readable medium, such as storage device 250, or from another device via communication interface 280. The software instructions contained in main memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer, different, differently arranged, or additional components than depicted in FIG. 2. In still other implementations, one or more components of device 200 may perform one or more other tasks described as being performed by one or more other components of device 200.

FIG. 3 depicts a diagram of exemplary interactions among components of an exemplary portion 300 of network 100. As illustrated, network portion 300 may include originating user device 110, terminating user device 110, jurisdictional route guide 120, INCP 130, database 135, route excluder 140, network 145, and network elements 170. Originating user device 110, terminating user device 110, jurisdictional route guide 120, INCP 130, database 135, route excluder 140, network 145, and network elements 170 may include the features described above in connection with, for example, FIG. 1.

As further shown in FIG. 3, if a calling party places a call 310 (e.g., via originating user device 110) to a called party (e.g., associated with terminating user device 110), network 145 may receive call 310, and may provide call information 320 to INCP 130. Call information 320 may include information associated with call 310, such as a called number, a calling party number, a charge number (CN), an automatic number identification (ANI), etc. INCP 130 may receive call information 320 from network 145. Prior to allowing call 310 to connect to terminating user device 110, INCP 130 may analyze call information 320 and may determine whether a jurisdictionally optimal route (e.g., that minimizes costs paid to carriers not associated with a carrier associated with INCP 130) can be utilized for routing call 310. INCP 130 may provide call information 320 to route excluder 140, and may receive a jurisdictional index table 330 (e.g., with multiple ordered call routing lists) from jurisdictional route guide 120.

Jurisdictional index table 330 may include the ordered call routing lists generated by jurisdictional route guide 120 and described above in connection with FIG. 1. For example, jurisdictional route guide 120 may look up rates in carrier rate tables based on the jurisdictional index, may sort carriers based on the rates, and may construct jurisdictional index table 330 based on the sorted carriers. Jurisdictional index table 330 may include call routing information (e.g., path information, carrier information, network element information, etc.) for every potential jurisdictional index to every potential destination associated with network 100. In one implementation, jurisdictional route guide 120 may periodically calculate and/or provide jurisdictional index table 330 to INCP 130 at a predetermined time intervals (e.g., weekly, monthly, etc.) or when new rate sheets or routing cost information becomes available.

As also shown in FIG. 3, route excluder 140 may receive call information 320 from INCP 130 and looping detection 335 (e.g., routes for call 310 that may produce a looping condition) from a looping detection system (not shown). Route excluder 140 may determine route exclusions 340 based on call information 320 and looping detection 335. For example, route excluder 140 may determine that call 310 is to be excluded from jurisdictional-based routing. Route excluder 140 may provide route exclusions 340 to INCP 130, and INCP 130 may exclude the determined routes provided in route exclusions 340 when determining a route for call 310.

INCP 130 may determine a jurisdictional index for call 310 based on the information actually present about the locations of originating and terminating user devices 110, and may select a route list for call 310 from jurisdictional index table 330 based on the determined jurisdictional index and destination of the call. INCP 130 may select a first route from the route list, and may determine if the selected route is viable (e.g., available, not excluded, etc.). If the selected route is not viable, INCP 130 may select a next route from the route list.

If the selected route is viable, INCP 130 may provide routing instructions 350 to network elements (e.g., network elements 170) in the selected route, may route call 310 to terminating user device 110, via the selected route (e.g., via network elements 170) and based on routing instructions 350, and may store route information 360 (e.g., associated with the selected route) in database 135. Routing instructions 350 may include information that instructs network elements 170 on how to route call 310 to terminating user device 110. For example, routing instructions 350 may include path information that identifies which components (e.g., switches, trunks, etc.) of network elements 170 that may be used to provide an end-to-end path between originating user device 110 and terminating user device 110. Route information 360 may include information associated with call 310 (e.g., call date, dialed number, called number, unmarked call, marked call, etc.), the selected route (e.g., originating switch, originating trunk, terminating trunk, etc.), routing instructions 350, the selected list from jurisdictional index table 330, etc.

Current telecommunications systems do not typically route calls based on jurisdiction, even though carriers have different rates for routing interstate calls and intrastate calls. In the arrangement depicted in FIG. 3, INCP 130 can accurately determine how carriers will characterize (e.g., as an interstate call or an intrastate call) a call (e.g., call 310) prior to routing call 310. Such an arrangement may enable INCP 130 to route calls at a lowest possible cost to the carrier that owns and/or manages INCP 130 and the network elements controlled by INCP 130. Furthermore, because jurisdictional route guide 120 pre-computes cost information (e.g., based on jurisdiction) for every potential jurisdictional index to every potential destination associated with network 100 and provides this information (e.g., via jurisdictional index table 330) to INCP 130, INCP 130 may quickly select the most cost effective route for a call. For example, INCP 130 may determine (e.g., based on jurisdiction) that call 310 could be routed via a first carrier's network elements at a cost of $0.20 per minute, via a second carrier's network elements at a cost of $0.30 per minute, and via a third carrier's network elements at a cost of $0.15 per minute. In such a scenario, INCP 130 may select to use the third carrier's network elements in order to route call 310 at the lowest possible cost.

Although FIG. 3 shows exemplary components of network portion 300, in other implementations, network portion 300 may contain fewer, different, differently arranged, or additional components than depicted in FIG. 3. In still other implementations, one or more components of network portion 300 may perform one or more other tasks described as being performed by one or more other components of network portion 300.

FIG. 4 illustrates a diagram of an exemplary portion 400 of a carrier call origination definition table. In one implementation, table portion 400 may represent definitions or factors used by carriers to determine whether a call is an interstate call or an intrastate call (i.e., to make a jurisdictional determination for the call). Jurisdictional route guide 120 and/or INCP 130 may utilize information provided in table portion 400, and/or other similar information, to determine a jurisdictional index for a call (e.g., for an end-to-end path between components of network 100). As illustrated in FIG. 4, table portion 400 may include a carrier field 410, a first definition field 420, a second definition field 430, a third definition field 440, a last definition field 450, and/or a variety of entries 460 associated with fields 410-450.

Carrier field 410 may include information associated with carriers that own and/or manage network elements that may be utilized by INCP 130 (e.g., in routing calls). For example, carrier field 410 may include entries for "Carrier1," "Carrier2," "Carrier3," "Carrier4," "On-Net1" (e.g., first network elements owned and/or managed INCP 130), "On-Net2" (e.g., second network elements owned and/or managed INCP 130), etc. In one example, each entry in carrier field 410 may include an identifier for a carrier, such as the carrier's name, a numeric identifier for the carrier, an alphanumeric identifier for the carrier, etc.

First definition field 420 may include a first definition used by a carrier (e.g., provided in carrier field 410) to determine whether a call is an interstate call or an intrastate call. For example, first definition field 420 may indicate that Carrier 1 and Carrier 2 use a charge number associated with the call as a first definition in determining whether the call is an interstate call or an intrastate call. If the call is a mobile originated call, first definition field 420 may indicate that Carrier3 and On-Net1 use a Jurisdiction Information Parameter (JIP) code (e.g., a field used in SS7 that indicates a geographic location of an originating caller or switch) as a first definition in determining whether the call is an interstate call or an intrastate call. First definition field 420 may indicate that Carrier4 uses a calling party number associated with the call as a first definition in determining whether the call is an interstate call or an intrastate call. First definition field 420 may indicate that On-Net2 uses an ANI associated with the call as a first definition in determining whether the call is an interstate call or an intrastate call.

Second definition field 430 may include a second definition used by a carrier (e.g., provided in carrier field 410), if the information required to evaluate the first definition does not exist for a particular call, to determine whether a call is an interstate call or an intrastate call. For example, second definition field 430 may indicate that Carrier 1 and Carrier 2 use a calling party number associated with the call as a second definition in determining whether the call is an interstate call or an intrastate call. Second definition field 430 may indicate that Carrier3 and On-Net1 use an ANI associated with the call as a second definition in determining whether the call is an interstate call or an intrastate call. Second definition field 430 may indicate that Carrier4 and On-Net2 do not use a second definition in determining whether the call is an interstate call or an intrastate call.

Third definition field 440 may include a third definition used by a carrier (e.g., provided in carrier field 410), if information required to evaluate the first and second definitions do not exist for the particular call, to determine whether a call is an interstate call or an intrastate call. For example, third definition field 440 may indicate that Carrier1, Carrier2, Carrier4, On-Net1, and On-Net2 do not use a third definition in determining whether the call is an interstate call or an intrastate call. Third definition field 440 may indicate that Carrier3 uses a calling party number associated with the call as a third definition in determining whether the call is an interstate call or an intrastate call.

Last definition field 450 may include a last definition used by a carrier (e.g., provided in carrier field 410), if information to evaluate the first, second, and third definitions do not exist, to determine whether a call is an interstate call or an intrastate call or whether the carrier uses a PIU method of rating the call. An "unmarked" call may be defined as a call that does not include any signaling information which can be used to determine the originating location of the call by each carrier (e.g., where such identifying information has been omitted or stripped off prior to the call arriving on a network, etc.). For example, if the call is "unmarked," last definition field 450 may indicate that Carrier1 and Carrier2 use a location of an ingress point-of-presence (POP) associated with the call as a last definition in determining whether the call is an interstate call or an intrastate call. If the call is unmarked, last definition field 450 may indicate that Carrier3, Carrier4, On-Net1, and On-Net2 use a Percent Interstate Usage (PIU) method in rating an unmarked call.

Although FIG. 4 shows exemplary information that may be provided in table portion 400, in other implementations, table portion 400 may contain less, different, differently arranged, or additional information than depicted in FIG. 4. In one example, table portion 400 may include definitions or factors used by carriers to make other jurisdictional determinations, such as whether a call is an unmarked call, an international call, an on-network only call, an off-network only call, a blended call (e.g., a combination of the aforementioned), etc.

FIG. 5 depicts a diagram of exemplary functional components of jurisdictional route guide 120. As illustrated, jurisdictional route guide 120 may include a database 500, a jurisdictional index definition generator 510, a carrier rate table determiner 520, and a jurisdictional index table constructor 530. The functions described in FIG. 5 may be performed by one or more of the exemplary components of device 200 depicted in FIG. 2.

Database 500 may include a storage device that may store information received by jurisdictional route guide 120. In one implementation, database 500 may store information described above in connection with FIG. 4 and information associated with inputs 540. Inputs 540 may include carrier rate inputs (e.g., carrier rates, on-net rates, etc.), a route sequence table, a carrier table, a trunk group table, a state table, an exclusion administration table, a switch definition administration table, etc. The route sequence table may include information associated with carriers, EO-CLLIs, jurisdictional indices, route sequences for each EO-CLLI and jurisdictional index, etc. The carrier table may include information associated with carriers, a maximum number of unmarked calls that may be received by each carrier, a date to reset marked and unmarked call counters for each carrier, etc. The trunk group table may include network element information (e.g., switch identifiers, trunk numbers, trunk states, etc.) associated with each carrier. The state table may include information identifying a carrier's assumed state (e.g., geographical state) with an originating switch (e.g., a switch receiving call 310 (FIG. 3)). The exclusion administration table may include criteria (e.g., whether an EO-CLLI is allowed to be jurisdictionally routed) that may be combined to create an exclusion rule (e.g., excluding a route for a particular call). The switch definition administration table may include information associated with a switch, such as a switch name, a switch state, etc.

Jurisdictional index definition generator 510 may include any hardware or combination of hardware and software that may receive jurisdictional information 550 from database 500, and may determine jurisdictional index definitions 560 based on jurisdictional information 550. Jurisdictional information 550 may include information (e.g., such as the information contained in table portion 400 and the information contained in database 500) for every potential jurisdictional index to every potential destination associated with network 100. In one example, jurisdictional index definition generator 510 may determine jurisdictional index definitions 560 in the manner described below in connection with FIG. 6. Jurisdictional index definition generator 510 may provide jurisdictional index definitions 560 to carrier rate table determiner 520 and jurisdictional index table constructor 530.

Carrier rate table determiner 520 may include any hardware or combination of hardware and software that may receive jurisdictional index definitions 560 from jurisdictional index definition generator 510 and may receive carrier rate and PIU information 570 from database 500. Carrier rate/PIU information 570 may include carrier rates for every potential jurisdiction to every potential destination associated with network 100. Carrier rate table determiner 520 may determine carrier rate tables 580 based on a conversion of defined carrier pricing schema (e.g. LATA-OCN) to an EO-CLLI destination naming convention and based on carrier rate/PIU information 570. Carrier rate table determiner 520 may determine a carrier rate table for each carrier providing every potential jurisdiction to every potential destination associated with network 100. In one example, carrier rate table determiner 520 may determine carrier rate tables 580 in the manner described below in connection with FIG. 7. Carrier rate table determiner 520 may provide carrier rate tables 580 to jurisdictional index table constructor 530.

Jurisdictional index table constructor 530 may include any hardware or combination of hardware and software that may receive jurisdictional index definitions 560 from jurisdictional index definition generator 510 and may receive carrier rate tables 580 from carrier rate table determiner 520. Jurisdictional index table constructor 530 may determine jurisdictional index table 330 based on jurisdictional index definitions 560 and carrier rate tables 580. For example, jurisdictional index table constructor 530 may retrieve rates in carrier rate tables 580 based on jurisdictional index definitions 560, and may sort carriers from a lowest rate to a highest rate. Jurisdictional index table constructor 530 may construct jurisdictional index table 330 (e.g., for every potential jurisdictional index to every potential destination associated with network 100) based on the sorted carriers. In one implementation, jurisdictional index table constructor 530 may construct an ordered call routing list depicted below in connection with FIG. 8. Jurisdictional index table constructor 530 may provide jurisdictional index table 330 to INCP 130.

Although FIG. 5 shows exemplary functional components of jurisdictional route guide 120, in other implementations, jurisdictional route guide 120 may contain fewer, different, differently arranged, or additional functional components than depicted in FIG. 5. In still other implementations, one or more functional components of jurisdictional route guide 120 may perform one or more other tasks described as being performed by one or more other functional components of jurisdictional route guide 120. In one example, jurisdictional route guide 120 may provide jurisdictional index definitions 560 and carrier rate tables 580 (e.g., along with jurisdictional index table 330) to INCP 130 (e.g., for storage in database 135).

FIG. 6 illustrates a diagram of an exemplary portion of a jurisdictional index definition table 600 capable of being generated and/or maintained by jurisdictional route guide 120 (e.g., by jurisdictional index definition generator 510). Jurisdictional index definition table 600 may provide a jurisdictional index definition (e.g., jurisdictional index definitions 560) for every potential jurisdictional index to all potential destinations associated with network 100. As shown, jurisdictional index definition table 600 may include a jurisdictional index field 610, a first carrier field 620, a second carrier field 630, a third carrier field 640, a fourth carrier field 650, an on-network 1 (On-Net1) field 660, an on-network 2 (On-Net2) field 670, and/or a variety of entries 680 associated with fields 610-670.

Jurisdictional index field 610 may include an index identifier (e.g., a number, a letter, numbers, letters, etc.) for jurisdictions associated with every potential jurisdictional index to every potential destination associated with network 100.

For example, as shown in FIG. 6, jurisdictional index field 610 may include a number (e.g., 1, 2, . . . , N) for each jurisdictional index.

First carrier field 620 may include jurisdictional information associated with a first carrier (Carrier1) that owns and/or manages network elements that may be utilized by INCP 130 (e.g., in routing calls). The jurisdictional information may include numbers that designate whether a call in a jurisdiction (e.g., defined by jurisdictional index field 610) is an intrastate call (e.g., designated by a "0"), an interstate call (e.g., designated by a "1"), or an unmarked call (e.g., designated by a "2") according to the first carrier (or other carriers, as shown in fields 630-670). For example, as shown in FIG. 6, first carrier field 620 may designate calls associated with jurisdictional indices 1-4 as intrastate calls, and may designate calls associated with jurisdictional indices 5, 32, N−1, and N as interstate calls.

Second carrier field 630 may include jurisdictional information associated with a second carrier (Carrier2) that owns and/or manages network elements that may be utilized by INCP 130 (e.g., in routing calls). As shown in FIG. 6, second carrier field 630 may designate calls associated with jurisdictional indices 1, 2, and 5 as intrastate calls, and may designate calls associated with jurisdictional indices 3, 4, 32, N−1, and N as interstate calls.

Third carrier field 640 may include jurisdictional information associated with a third carrier (Carrier3) that owns and/or manages network elements that may be utilized by INCP 130 (e.g., in routing calls). As shown in FIG. 6, third carrier field 640 may designate calls associated with jurisdictional indices 1, 3, 5, and N−1 as intrastate calls, and may designate calls associated with jurisdictional indices 2, 4, 32, and N as interstate calls.

Fourth carrier field 650 may include jurisdictional information associated with a fourth carrier (Carrier4) that owns and/or manages network elements that may be utilized by INCP 130 (e.g., in routing calls). As shown in FIG. 6, fourth carrier field 650 may designate calls associated with jurisdictional indices 1-3 as intrastate calls, may designate calls associated with jurisdictional indices 4, 5, and 32 as interstate calls, and may designate calls associated with jurisdictional indices N−1 and N as unmarked calls.

On-Net1 field 660 may include jurisdictional information associated with network destinations that are owned, managed, and/or utilized by INCP 130 (e.g., in routing calls). As shown in FIG. 6, On-Net1 field 660 may designate calls associated with jurisdictional indices 1, 2, and 5 as intrastate calls, and may designate calls associated with jurisdictional indices 3, 4, 32, N−1, and N as interstate calls.

On-Net2 field 670 may include jurisdictional information associated with other network destinations that are owned, managed, and/or utilized by INCP 130 (e.g., in routing calls). As shown in FIG. 6, On-Net2 field 670 may designate calls associated with jurisdictional indices 1 and 4 as intrastate calls, may designate calls associated with jurisdictional indices 2, 5, 32, and N−1 as interstate calls, and may designate calls associated with jurisdictional indices 3 and N as unmarked calls.

Although FIG. 6 shows exemplary information that may be provided in jurisdictional index definition table 600, in other implementations, jurisdictional index definition table 600 may contain less, different, differently arranged, or additional information than depicted in FIG. 6.

FIG. 7 depicts a diagram of exemplary portion of a carrier rate table 700 capable of being generated and/or maintained by jurisdictional route guide 120 (e.g., by carrier rate table determiner 520). In one implementation, carrier rate table 700 may be provided for each carrier or on-network path associated with network 100. Each carrier rate table 700 may include carrier rates for every potential jurisdictional index to every potential destination associated with network 100 and for every jurisdictional index definition (e.g., as provided in jurisdictional index definition table 600 (FIG. 6)). As shown, carrier rate table 700 may include an EO-CLLI field 710, an operating company number (OCN) field 720, an EO-OCN field 730, a jurisdictional index field 740, a rate type field 750, a rate type code field 760, a rate field 770, and/or a variety of entries 780 associated with fields 710-770.

EO-CLLI field 710 may include information identifying an end office common language identifier (EO-CLLI) code associated with a terminating call. EO-CLLI field 710 may include a numeric identifier for the EO-CLLI code, an alphanumeric identifier for the EO-CLLI code, etc. Two possible EO-CLLI codes are shown in FIG. 7, (e.g., "ABCD1234" and "BCDE4567"), but the carrier rate table 700 may include EO-CLLI codes for all possible terminating call destinations offered by this carrier.

OCN field 720 may include information identifying an operating company number (OCN) of the terminating EO-CLLI. In one implementation, OCN field 720 may identify network elements owned and/or managed by a particular carrier or may identify the particular carrier. OCN field 720 may include a numeric identifier for the OCN, an alphanumeric identifier for the OCN, etc. For example, as shown in FIG. 7, OCN field 720 may include two OCNs (e.g., "7076" and "1357").

EO-OCN field 730 may include information identifying whether an end office OCN (EO-OCN), to which the originating call will terminate, is enabled. EO-OCN field 730 may include a numeric identifier for the EO-OCN, an alphanumeric identifier for the EO-OCN, etc. For example, as shown in FIG. 7, EO-OCN field 730 may indicate that one EO-OCN (e.g., "1"), to which the originating call will terminate, is enabled.

Jurisdictional index field 740 may include an identifier (e.g., a number, a letter, numbers, letters, etc.) for combinations of jurisdictional assessments from each possible carrier associated with every potential end-to-end path between the EO-CLLI (e.g., associated with EO-CLLI field 710) and the EO-OCN (e.g., associated with EO-OCN field 730). For example, as shown in FIG. 7, jurisdictional index field 740 may include a number (e.g., 1, 2, . . . , N) for each jurisdictional index.

Rate type field 750 may include information identifying a rate type associated with the jurisdictional index identified in jurisdictional index field 740. The rate type may include an indicator identifying the rate as an intrastate rate, an interstate rate, an unmarked rate, or another rate type. As shown in FIG. 7, rate type field 750 may include an intrastate rate for jurisdictional indices 1 and 2, may include an interstate rate for jurisdiction index 32, and may include an unmarked rate for jurisdictional indices N−1 and N.

Rate type code field 760 may include information identifying a rate type code associated with the rate type identified in rate type field 750. In one example, the rate type code may include numbers such as "0," "1," or "2." As shown in FIG. 7, rate type code field 760 may include one number (e.g., "0") for an intrastate rate (e.g., provided in rate type field 750), another number (e.g., "1") for an interstate rate (e.g., provided in rate type field 750), and still another number (e.g., "2") for an unmarked rate (e.g., provided in rate type field 750).

Rate field 770 may include information identifying a rate charged per minute for a call terminated to the EO-CLLI (e.g., associated with EO-CLLI field 710) and having a particular jurisdictional index (e.g., field 740). For example, as shown in FIG. 7, rate field 770 may include a rate of $0.195000 per minute for intrastate calls terminated to the EO-CLLI designated "ABCD1234," a rate of $0.004200 per minute for interstate calls terminated to the EO-CLLI designated "ABCD1234," and a rate of $0.134400 per minute for unmarked calls terminated to the EO-CLLI designated "ABCD1234." As further shown in FIG. 7, rate field 770 may include a rate of $0.251700 per minute for intrastate calls terminated to the EO-CLLI designated "BCDE4567," a rate of $0.006750 per minute for interstate calls terminated to the EO-CLLI designated "BCDE4567," and a rate of $0.206600 per minute for unmarked calls terminated to the EO-CLLI designated "BCDE4567."

Although FIG. 7 shows exemplary information that may be provided in carrier rate table 700, in other implementations, carrier rate table 700 may contain less, different, differently arranged, or additional information than depicted in FIG. 7.

FIG. 8 illustrates a diagram of an exemplary portion of a jurisdictional index table 800 capable of being generated and/or maintained by jurisdictional route guide 120 (e.g., by jurisdictional index table constructor 530). In one implementation, a jurisdictional index table 800 may be provided for every potential jurisdictional index to every potential destination associated with network 100 to generate jurisdictional index table 330 (FIG. 3). As shown in FIG. 8, jurisdictional index table 800 may include an EO-CLLI field 810, an OCN field 820, a jurisdictional index field 830, a route choice field 840, a switch identifier (ID) field 850, a carrier field 860, and/or a variety of entries 870 associated with fields 810-860.

EO-CLLI field 810 may include information identifying an EO-CLLI code where a call will be terminated. EO-CLLI field 810 may include a numeric identifier for the EO-CLLI code, an alphanumeric identifier for the EO-CLLI code, etc. For example, as shown in FIG. 8, EO-CLLI field 810 may include one EO-CLLI code (e.g., "ABCD1234") associated with the terminating location of the call.

OCN field 820 may include information identifying an OCN associated with the EO-CLLI. OCN field 820 may include a numeric identifier for the OCN, an alphanumeric identifier for the OCN, etc. For example, as shown in FIG. 8, OCN field 820 may include one OCN (e.g., "7076") to which the call will terminate.

Jurisdictional index field 830 may include an identifier (e.g., a number, a letter, numbers, letters, etc.) for a jurisdictional index associated with potential end-to-end paths to the EO-CLLI (e.g., associated with EO-CLLI field 810). For example, as shown in FIG. 8, jurisdictional index field 830 may include a number (e.g., "2") for the jurisdictional index.

Route choice field 840 may include a numeric order for ordered calling routing list 800 (e.g., from the least expensive call route to the most expensive call route). For example, as shown in FIG. 8, a route choice of "1" (e.g., in route choice field 840) may indicate a least expensive call route and a route choice of "5" may indicate a most expensive call route for the particular call routing provided in jurisdictional index table 800.

Switch ID field 850 may include information identifying a switch (e.g., owned and/or managed by INCP 130) that receives the originating call. Switch ID field 850 may include a numeric identifier for the switch, an alphanumeric identifier for the switch, etc. For example, as shown in FIG. 8, switch ID field 850 may include one identifier for the switch (e.g., "123") that receives the originating call.

Carrier field 860 may include information associated with carriers that own and/or manage network elements that may be utilized by INCP 130 to route the originating call. For example, carrier field 860 may include entries for "Carrier1," "Carrier2," "Carrier4," "Carrier5," "On-Net1," etc. In one example, each entry in carrier field 860 may include an identifier for a carrier, such as the carrier's name, a numeric identifier for the carrier, an alphanumeric identifier for the carrier, etc. As shown in FIG. 8, Carrier2 may provide the least expensive call route and On-Net1 may provide the most expensive call route for the particular call routing provided in jurisdictional index table 800.

Although FIG. 8 shows exemplary information that may be provided in jurisdictional index table 800, in other implementations, jurisdictional index table 800 may contain less, different, differently arranged, or additional information than depicted in FIG. 8.

Figure 9:
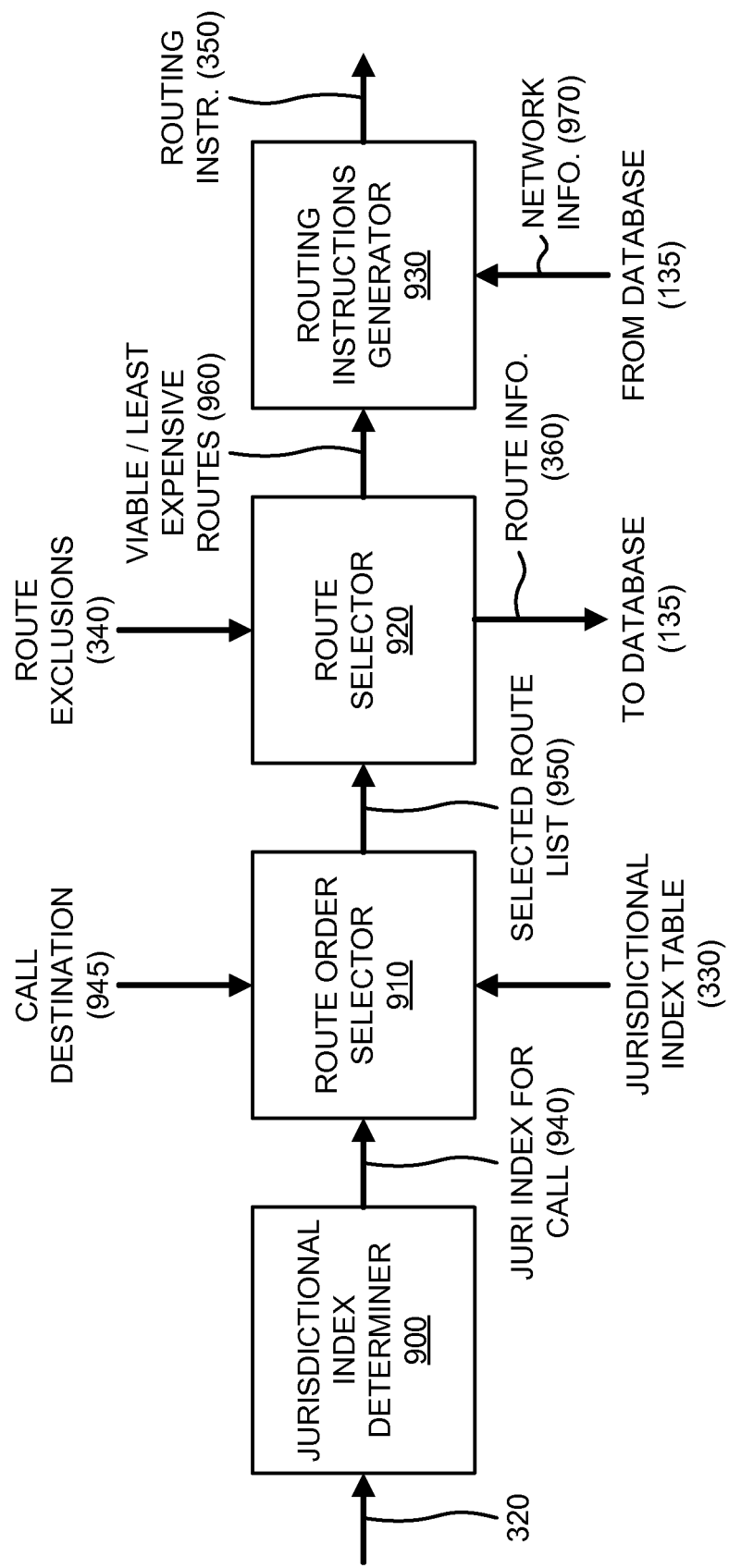
FIG. 9 depicts a diagram of exemplary functional components of the INCP illustrated in FIG. 1.

FIG. 9 depicts a diagram of exemplary functional components of INCP 130. As illustrated, INCP 130 may include a jurisdictional index determiner 900, a route order selector 910, a route selector 920, and a routing instructions generator 930. The functions described in FIG. 9 may be performed by one or more of the exemplary components of device 200 depicted in FIG. 2.

Jurisdictional index determiner 900 may include any hardware or combination of hardware and software that may receive call information 320, and may determine a jurisdictional index 940 for call 310. In one example, jurisdictional index determiner 900 may determine jurisdictional index 940 for call 310 in the manner described above in connection with FIG. 6. Further details of jurisdictional index determiner 900 are provided below in connection with, for example, FIG. 10. Jurisdictional index determiner 900 may provide jurisdictional index 940 to route order selector 910.

Route order selector 910 may include any hardware or combination of hardware and software that may receive jurisdictional index 940 for call 310 from jurisdictional index determiner 900, may receive jurisdictional index table 330 provided by jurisdictional route guide 120, and may receive a destination 945 for call 310 (e.g., from call information 320). Route order selector 910 may select a route list 950 from the ordered call routing lists of jurisdictional index table 330 based on jurisdictional index 940 and destination 945 for call 310. For example, route order selector 910 may compare jurisdictional index 940 to the EO-CLLI and jurisdictional indices provided in jurisdictional index table 330 (e.g., as shown in jurisdictional index table 800 of FIG. 8), and may determine selected route list 950 to be one of the ordered call routing lists of jurisdictional index table 330 with a jurisdictional index that matches jurisdictional index 940 and a destination matching the EO-CLLI. Route order selector 910 may provide selected route list 950 to route selector 920.

Route selector 920 may include any hardware or combination of hardware and software that may receive selected route list 950 from route order selector 910 and may receive route exclusions 340 provided by route excluder 140. Route selector 920 may select viable and/or least expensive routes 960 from selected route list 950 based on route exclusions 340. Route selector 920 may provide route information 360 associated with viable/least expensive routes 960 to database 135 for storage, and may provide viable/least expensive routes 960 to routing instructions generator 930. Further details of route selector 920 are provided below in connection with, for example, FIG. 13.

Routing instructions generator 930 may include any hardware or combination of hardware and software that may receive viable/least expensive routes 960 from route selector 920 and may receive network information 970 from database 135. Network information 970 may include information associated with network elements (e.g., network elements 160/

170) of network 100, such as network identifiers, device identifiers, trunk identifiers, etc. Routing instructions generator 930 may generate routing instructions 350 for viable/least expensive routes 960 by using network information 970. For example, routing instructions generator 930 may create an end-to-end path that corresponds to viable/least expensive routes 960 (e.g., through network 100) using network information 970, and may output the created path as routing instructions 350.

Although FIG. 9 shows exemplary functional components of INCP 130, in other implementations, INCP 130 may contain fewer, different, differently arranged, or additional functional components than depicted in FIG. 9. In still other implementations, one or more functional components of INCP 130 may perform one or more other tasks described as being performed by one or more other functional components of INCP 130.

Figure 10:
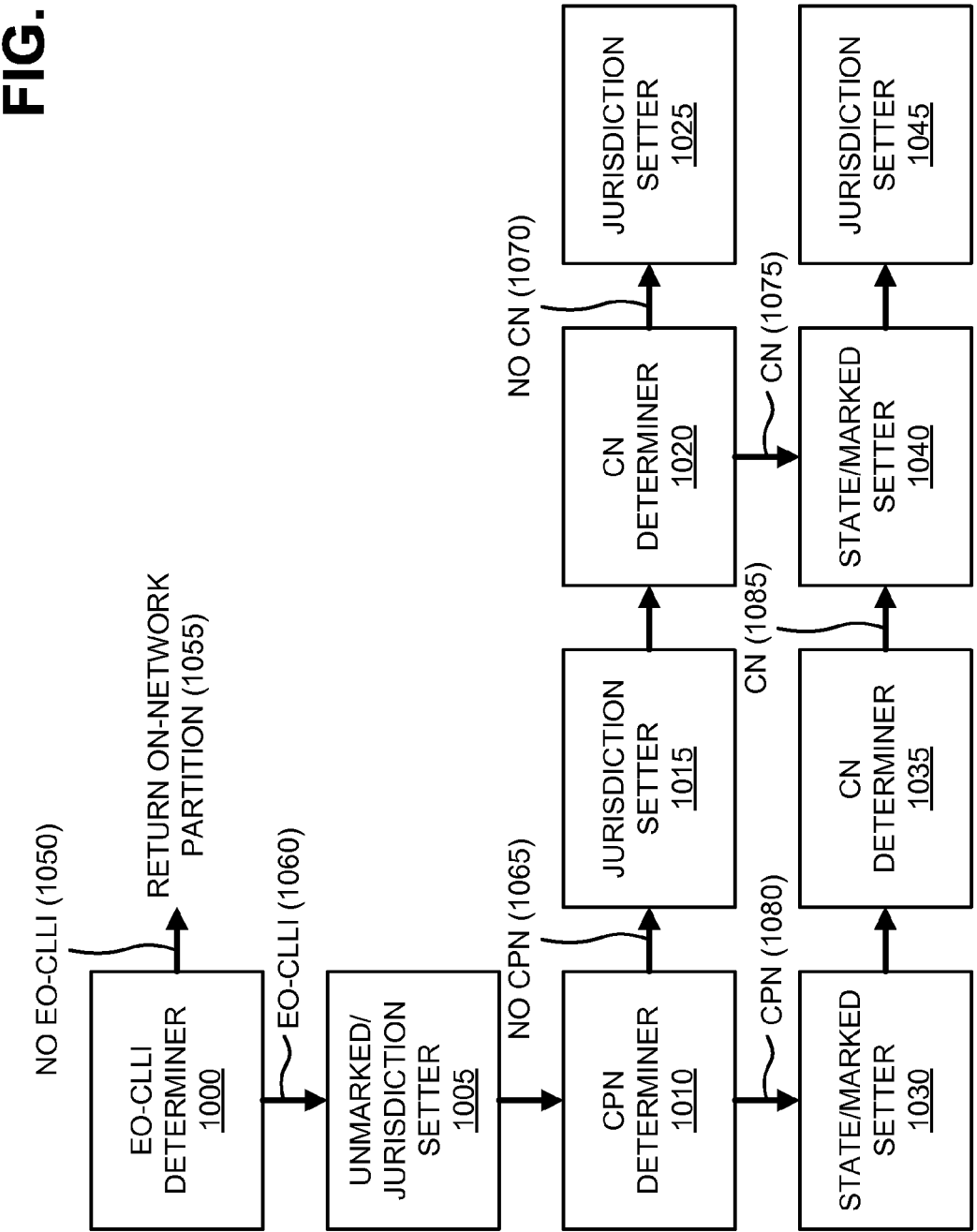
FIGS. 10-12 illustrate diagrams of exemplary functional components of a jurisdictional index determiner depicted in FIG. 9.
Figure 11:
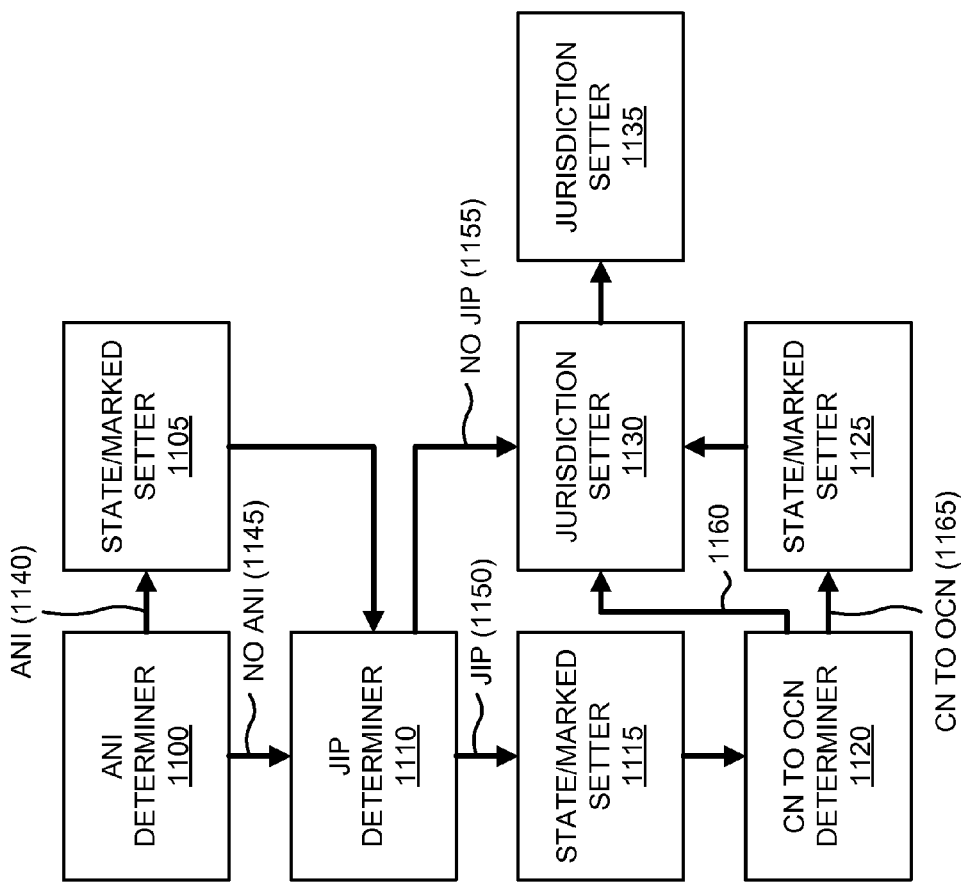
Figure 12:
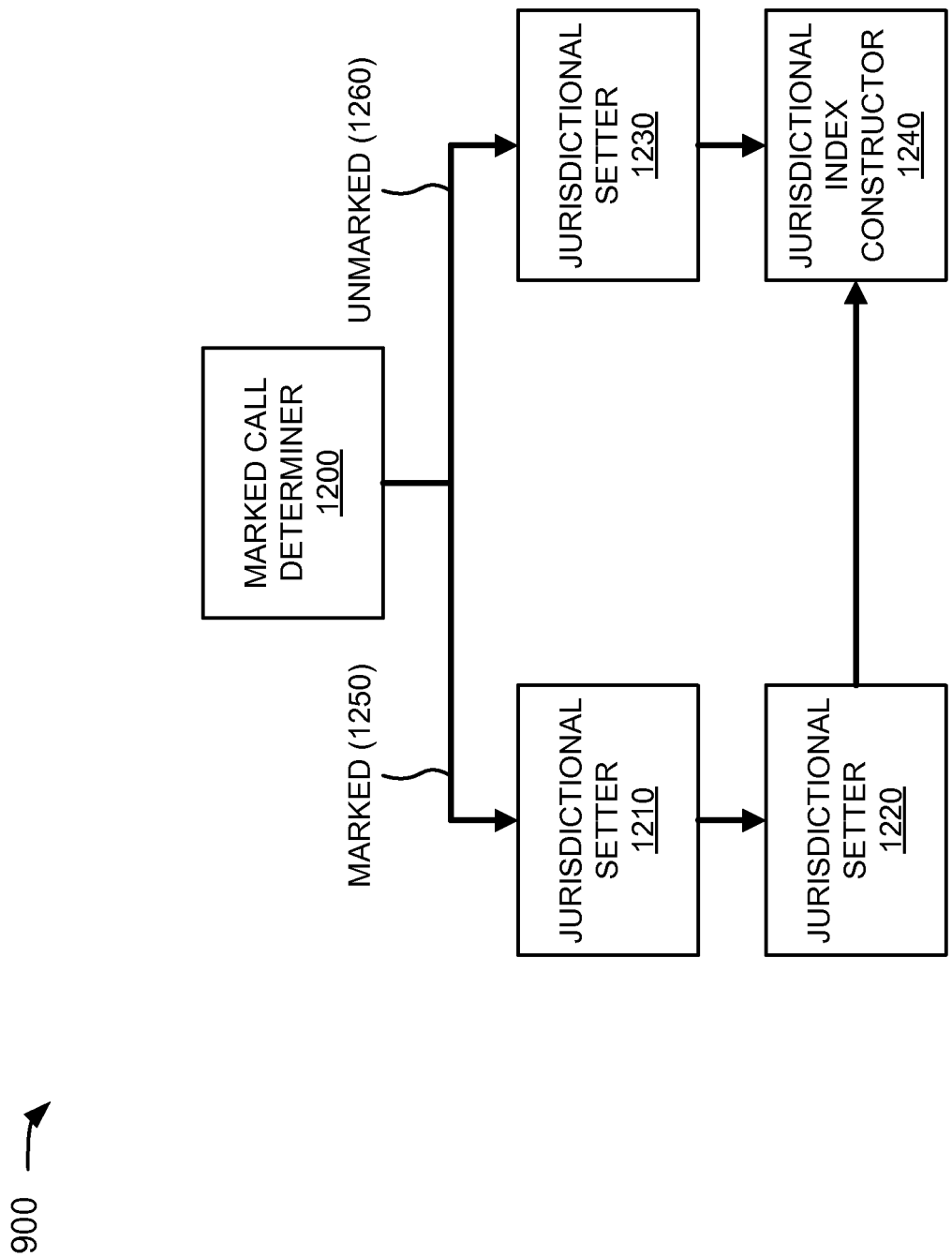

FIGS. 10-12 illustrate diagrams of exemplary functional components of jurisdictional index determiner 900. Jurisdictional index determiner 900 may construct a jurisdictional index (e.g., as shown in FIG. 8) based on carrier rules (e.g., as shown in FIG. 4) using an actual call marking on call 310 for relevant variables (e.g., charge number, calling party number, etc.) needed by each carrier. Each call may, in general, have different fields populated, so the functions performed by jurisdictional index determiner 900 may be performed on a call by call basis. As illustrated in FIG. 10, jurisdictional index determiner 900 may include an EO-CLLI determiner 1000, an unmarked/jurisdiction setter 1005, a calling party number (CPN) determiner 1010, a jurisdiction setter 1015, a charge number (CN) determiner 1020, a jurisdiction setter 1025, a state/marked setter 1030, a CN determiner 1035, a state/marked setter 1040, and a jurisdiction setter 1045. The functions described in FIGS. 10-12 may be performed by one or more of the exemplary components of device 200 depicted in FIG. 2.

EO-CLLI determiner 1000 may include any hardware or combination of hardware and software that may determine whether a called number (e.g., of call 310) has an EO-CLLI code in jurisdictional index table 800 and whether the EO-CLLI is enabled. If the called number does not have an EO-CLLI in jurisdictional index table 800 or the EO-CLLI is not enabled, EO-CLLI determiner 1000 may provide an indication 1050 that EO-CLLI is not in jurisdictional index table 800 or the EO-CLLI is not enabled, and an on-network partition may be returned, as indicated by reference number 1055. If the called number has an EO-CLLI in jurisdictional table 800 and the EO-CLLI is enabled, EO-CLLI determiner 1000 may provide an indication 1060, to unmarked/jurisdiction setter 1005, indicating that the EO-CLLI is in jurisdictional table 800 and is enabled.

Unmarked/jurisdiction setter 1005 may include any hardware or combination of hardware and software that may receive indication 1060 from EO-CLLI determiner 1000, may set call 310 to unmarked (e.g., "0") for the carriers associated with network 100, and may set the jurisdiction for call 310 to intrastate (e.g., "0") for the carriers associated with network 100.

CPN determiner 1010 may include any hardware or combination of hardware and software that may determine whether a calling party number (CPN) associated with call 310 is present and valid. If the CPN associated with call 310 is not present or is invalid, CPN determiner 1010 may provide an indication 1065, to jurisdiction setter 1015, indicating that the CPN associated with call 310 is not present or is invalid. If the CPN associated with call 310 is present and valid, CPN determiner 1010 may provide an indication 1080, to state/marked setter 1030, indicating that the CPN associated with call 310 is present and valid.

Jurisdiction setter 1015 may include any hardware or combination of hardware and software that may receive indication 1065, and may set a jurisdiction for call 310 to unmarked for a particular carrier based on indication 1065.

CN determiner 1020 may include any hardware or combination of hardware and software that may determine whether a charge number (CN) associated with call 310 is present and valid. If the CN associated with call 310 is not present or is invalid, CN determiner 1020 may provide an indication 1070, to jurisdiction setter 1025, indicating that the CN associated with call 310 is not present or is invalid. If the CN associated with call 310 is present and valid, CN determiner 1020 may provide an indication 1075, to state/marked setter 1040, indicating that the CN associated with call 310 is present and valid.

Jurisdiction setter 1025 may include any hardware or combination of hardware and software that may receive indication 1070 from CN determiner 1020, and may set a jurisdiction for call 310 to interstate (e.g., "1") for a particular carrier of network 100, if the state of the particular carrier is not the same as the state of the called (or dialed) number associated with call 310.

State/marked setter 1030 may include any hardware or combination of hardware and software that may receive indication 1080 from CPN determiner 1010, may set a state for carriers associated with network 100 to a state of the CPN associated with call 310, and may set call 310 to marked (e.g., "1") for some of the carriers based on indication 1080.

CN determiner 1035 may include any hardware or combination of hardware and software that may determine whether a CN associated with call 310 is present and valid. If the CN associated with call 310 is present and valid, CN determiner 1035 may provide an indication 1085, to state/marked setter 1040, indicating that the CN associated with call 310 is present and valid.

State/marked setter 1040 may include any hardware or combination of hardware and software that may receive indication 1075 from CN determiner 1020 and may receive indication 1085 from CN determiner 1035. State/marked setter 1040 may set a state for some carriers to a state of the CN associated with call 310 and may set call 310 to marked (e.g., "1") for some carriers based on indications 1075 and/or 1085.

Jurisdiction setter 1045 may include any hardware or combination of hardware and software that may set a jurisdiction for call 310 to interstate (e.g., "1") for some carriers of network 100, if the states of the carriers are not the same as the state of the called (or dialed) number associated with call 310.

As illustrated in FIG. 11, jurisdictional index determiner 900 may include an ANI determiner 1300, a state/marked setter 1105, a Jurisdiction Information Parameter (JIP) code determiner 1110, a state/marked setter 1115, a called number (CN) to operating company number (OCN) determiner 1320, a state/marked setter 1125, a jurisdiction setter 1130, and a jurisdiction setter 1135.

ANI determiner 1100 may include any hardware or combination of hardware and software that may determine whether an ANI associated with call 310 is present and valid. If the ANI associated with call 310 is present and valid, ANI determiner 1100 may provide an indication 1140, to state/marked setter 1105, indicating that the ANI associated with call 310 is present and valid. If the ANI associated with call 310 is not present or is invalid, ANI determiner 1100 may provide an indication 1145, to JIP determiner 1110, indicating that the ANI associated with call 310 is not present or is invalid.

State/marked setter 1105 may include any hardware or combination of hardware and software that may receive indication 1140 from ANI determiner 1100, may set a state for some carriers to a state of the ANI associated with call 310, and may set call 310 to marked (e.g., "1") for some carriers based on indication 1140.

JIP determiner 1110 may include any hardware or combination of hardware and software that may determine whether a JIP associated with call 310 is present and valid and whether the call is mobile originated as indicated by the information digits field in call information 320. If the JIP associated with call 310 is present and valid and the call is mobile originated, JIP determiner 1110 may provide an indication 1150, to state/marked setter 1115, indicating that the JIP associated with call 310 is present and valid. If the JIP associated with call 310 is not present or is invalid, JIP determiner 1110 may provide an indication 1155, to jurisdictional index setter 1130, indicating that the JIP associated with call 310 is not present or is invalid.

State/marked setter 1115 may include any hardware or combination of hardware and software that may receive indication 1150 from JIP determiner 1110, may set a state for a particular carrier to a state of the JIP associated with call 310, and may set call 310 to marked (e.g., "1") for the particular carrier based on indication 1150.

CN to OCN determiner 1120 may include any hardware or combination of hardware and software that may determine whether the CN associated with call 310 terminates to an OCN where JIP is relevant (e.g. On-Net1 from FIG. 4). If the CN associated with call 310 does not terminate to such an OCN, CN to OCN determiner 1120 may provide an indication 1160, to jurisdiction setter 1130, indicating that the CN associated with call 310 does not terminate to such an OCN. If the CN associated with call 310 terminates to such an OCN, CN to OCN determiner 1120 may provide an indication 1165, to state/marked setter 1125, indicating that the CN associated with call 310 terminates to the OCN.

State/marked setter 1125 may include any hardware or combination of hardware and software that may receive indication 1165 from CN to OCN determiner 1120, may set a state for a particular carrier to a state of the JIP associated with call 310, and may set call 310 to marked (e.g., "1") for the particular carrier based on indication 1165.

Jurisdiction setter 1130 may include any hardware or combination of hardware and software that may receive indication 1160 from CN to OCN determiner 1120, may receive indication 1155 from JIP determiner 1110, and may receive information (e.g., the state of the particular carrier and that call 310 is set to marked for the particular carrier) from state/marked setter 1125. Based on indications 1155 and 1160, jurisdiction setter 1130 may set a jurisdiction for call 310 to interstate (e.g., "1") for a particular carrier of network 100, if the state of the particular carrier is not the same as the state of the terminating location of call 310 and if call 310 is set to marked (e.g., "1").

Jurisdiction setter 1135 may include any hardware or combination of hardware and software that may set a jurisdiction for call 310 to unmarked (e.g., "2") for a particular carrier of network 100, if call 310 is set to unmarked (e.g., "0").

As illustrated in FIG. 12, jurisdictional index determiner 900 may include a marked call determiner 1200, a jurisdiction setter 1210, a jurisdiction setter 1220, a jurisdiction setter 1230, and a jurisdictional index constructor 1240.

Marked call determiner 1200 may include any hardware or combination of hardware and software that may determine whether call 310 is marked or unmarked for a particular carrier. If call 310 is marked for the particular carrier, marked call determiner 1200 may provide an indication 1250, to jurisdiction setter 1210, indicating that call 310 is marked for the particular carrier. If call 310 is unmarked for the particular carrier, marked call determiner 1200 may provide an indication 1260, to jurisdiction setter 1230, indicating that call 310 is unmarked for the particular carrier.

Jurisdiction setter 1210 may include any hardware or combination of hardware and software that may receive indication 1250 from marked call determiner 1200, and may, based on indication 1250, set a jurisdiction for call 310 to interstate (e.g., "1") for a particular carrier of network 100, if the state of the particular carrier is not the same as the state of the called number associated with call 310.

Jurisdiction setter 1220 may include any hardware or combination of hardware and software that may set a jurisdiction for call 310 to interstate (e.g., "1") for a particular carrier of network 100, if the jurisdiction for call 310 (for the particular carrier) was previously set to unmarked (e.g., "2") and if the state of the particular carrier is not the same as the state of the called number associated with call 310.

Jurisdiction setter 1230 may include any hardware or combination of hardware and software that may receive indication 1260 from marked call determiner 1200, and may, based on indication 1260, set a jurisdiction for call 310 to unmarked (e.g., "2") for a particular carrier of network 100.

Jurisdictional index constructor 1240 may include any hardware or combination of hardware and software that may receive jurisdictions associated with the various carriers of network 100 (e.g., as determined by the functional components of FIGS. 10-12). Jurisdictional index constructor 1240 may construct jurisdictional index 940 for call 310 based on the jurisdictions determined by the functional components of FIGS. 10-12.

Although FIGS. 10-12 show exemplary functional components of jurisdictional index determiner 900, in other implementations, jurisdictional index determiner 900 may contain fewer, different, differently arranged, or additional functional components than depicted in FIGS. 10-12. In still other implementations, one or more functional components of jurisdictional index determiner 900 may perform one or more other tasks described as being performed by one or more other functional components of jurisdictional index determiner 900.

Figure 13:
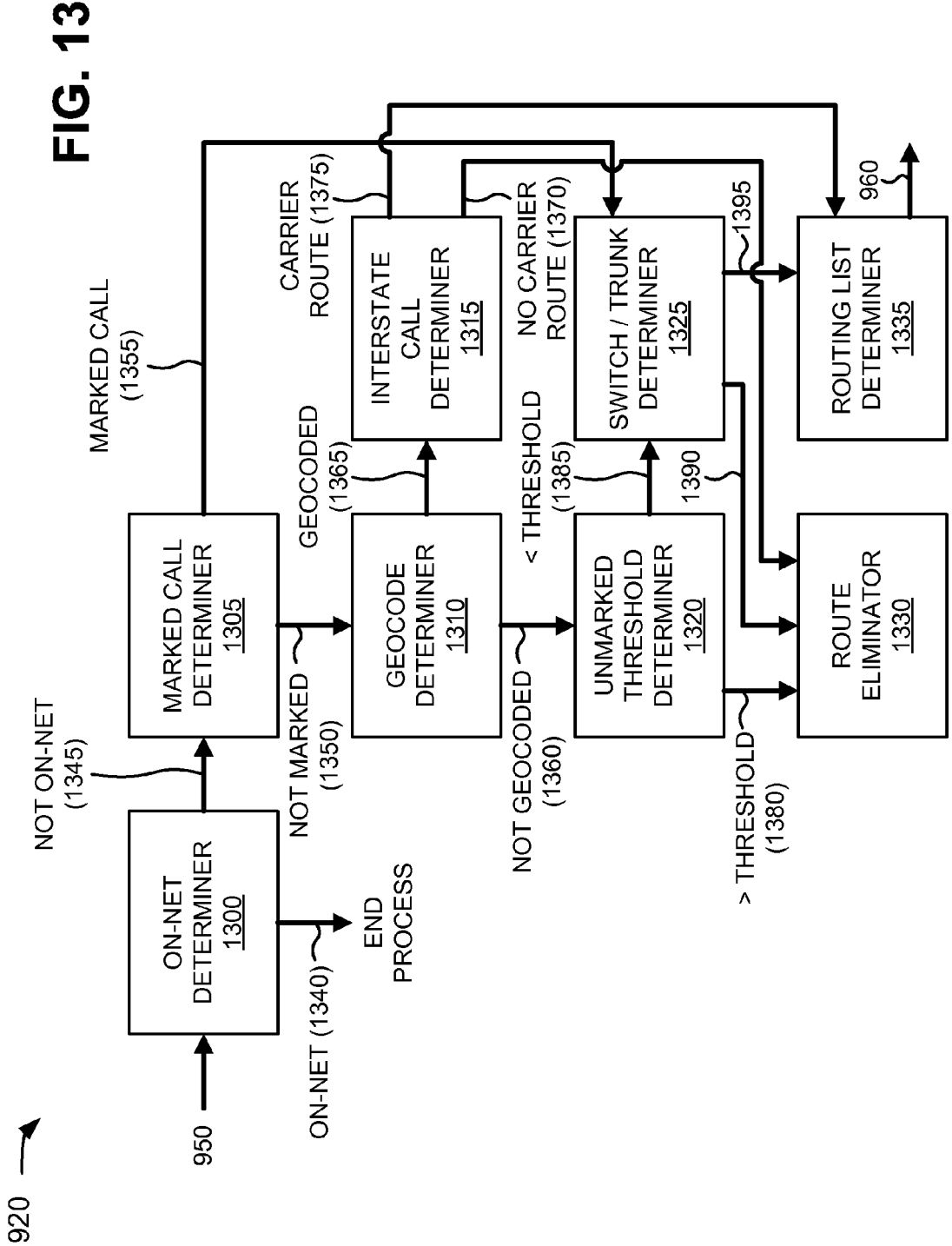
FIG. 13 depicts a diagram of exemplary functional components of a route selector illustrated in FIG. 9.

FIG. 13 depicts a diagram of exemplary functional components of route selector 920. As illustrated, route selector 920 may include an on-net determiner 1300, a marked call determiner 1305, a geocode determiner 1310, an interstate call determiner 1315, an unmarked threshold determiner 1320, switch/trunk determiner 1325, a route eliminator 1330, and a routing list determiner 1335. The functions described in FIG. 13 may be performed by one or more of the exemplary components of device 200 depicted in FIG. 2.

On-net determiner 1300 may include any hardware or combination of hardware and software that may receive selected route list 950 and may determine if a first route of selected route list 950 is on-network (e.g., owned and/or manager by the owner/manager of INCP 130). If on-net determiner 1300 determines the first route to be on-network, on-net determiner 1300 may indicate that the first route is on-net 1340, may determine that the first route is one of viable/least expensive routes 960, and may end the process performed by route selector 920. If on-net determiner 1300 determines the first route to not be on-network, on-net determiner 1300 may provide an indication 1345, to marked call determiner 1305, that the first route in not on-network.

Marked call determiner 1305 may include any hardware or combination of hardware and software that may receive indication 1345 and may determine if a carrier associated with the first route considers call 310 to be a marked call or an unmarked call. If marked call determiner 1305 determines that the carrier associated with the first route considers call 310 to be an unmarked call, marked call determiner 1305 may provide an indication 1350, to geocode determiner 1310, that call 310 is an unmarked call. If marked call determiner 1305 determines that the carrier associated with the first route considers call 310 to be a marked call, marked call determiner 1305 may provide an indication 1355, to switch/trunk determiner 1325, that call 310 is a marked call.

Geocode determiner 1310 may include any hardware or combination of hardware and software that may receive indication 1350 and may determine if the carrier associated with the first route geocodes unmarked calls. If geocode determiner 1310 determines that the carrier associated with the first route does not geocode unmarked calls, geocode determiner 1310 may provide an indication 1360, to unmarked threshold determiner 1320, that call 310 is not geocoded. If geocode determiner 1310 determines that the carrier associated with the first route geocodes unmarked calls, geocode determiner 1310 may provide an indication 1365, to interstate call determiner 1315, that call 310 is geocoded.

Interstate call determiner 1315 may include any hardware or combination of hardware and software that may receive indication 1365 and may determine if the carrier associated with the first route provides a carrier route to the terminating location (e.g., a state) of call 310. If interstate call determiner 1315 determines that the carrier associated with the first route only provides a carrier terminating trunk group having the same geocoded state as the state of the originating location, of call 310, interstate call determiner 1315 may provide an indication 1370, to route eliminator 1330, that the carrier does not provide a carrier route for call 310. If interstate call determiner 1315 determines the carrier associated with the first route provides a terminating trunk group having a different geocoded state than the state of the originating location, of call 310, interstate call determiner 1315 may provide an indication 1375, to routing list determiner 1335, that the carrier provides a carrier route for call 310 and may identify that route to routing list determiner 1335.

Unmarked threshold determiner 1320 may include any hardware or combination of hardware and software that may receive indication 1360 and may determine if the carrier associated with the first route would exceed an unmarked call threshold if call 310 is routed by the carrier. Some carriers impose limits on the number of unmarked calls per local access transport area (LATA) that they will accept in a particular time period. If unmarked threshold determiner 1320 determines that the carrier associated with the first route would exceed an unmarked call threshold if call 310 is routed by the carrier, unmarked threshold determiner 1320 may provide an indication 1380, to route eliminator 1330, that the unmarked call threshold would be exceeded by the carrier. If unmarked threshold determiner 1320 determines the carrier associated with the first route would not exceed an unmarked call threshold if call 310 is routed by the carrier, unmarked threshold determiner 1320 may provide an indication 1385, to switch/trunk determiner 1325, that the unmarked call threshold would not be exceeded by the carrier.

Switch/trunk determiner 1325 may include any hardware or combination of hardware and software that may receive indication 1385 and may determine if and where the carrier associated with the first route has a trunk(s) that is able to route call 310 to the terminating location based on the originating location of call 310. If switch/trunk determiner 1325 determines that the carrier associated with the first route does not have trunk(s) that are able to route call 310 to the terminating location, switch/trunk determiner 1325 may provide an indication 1390, to route eliminator 1330, that the carrier does not have switch(es)/trunk(s) that are able to route call 310. If switch/trunk determiner 1325 determines the carrier associated with the first route has switch(es)/trunk(s) that are able to route call 310 to the terminating location, switch/trunk determiner 1325 may provide an indication 1395, to routing list determiner 1335, that the carrier has trunk(s) that are able to route call 310 and on which switch those trunks are located.

Route eliminator 1330 may include any hardware or combination of hardware and software that may receive one of indications 1370, 1380, or 1390, and may eliminate the first route of selected route list 950 as a possible path for routing call 310 based on one of indications 1370, 1380, or 1390. Although not shown in FIG. 13, route eliminator 1330 may provide an indication, to marked call determiner 1305, that the first route is eliminated (e.g., not viable), and marked call determiner 1305 may begin the process depicted in FIG. 13 for a next route of selected route list 950. The process depicted in FIG. 13 may be repeated for one or more of the routes provided in selected route list 950.

Routing list determiner 1335 may include any hardware or combination of hardware and software that may receive one of indications 1375 or 1395, and may determine a list of one or more viable/least expensive routes 960 based on one of indications 1375 or 1395. In one example, the list of one or more viable/least expensive routes 960 may include a list of routes (e.g., including the carrier, switches, trunks, etc. associated with the routes) that is ordered from least expensive to most expensive.

Although FIG. 13 shows exemplary functional components of route selector 920, in other implementations, route selector 920 may contain fewer, different, differently arranged, or additional functional components than depicted in FIG. 13. In still other implementations, one or more functional components of route selector 920 may perform one or more other tasks described as being performed by one or more other functional components of route selector 920.

Figure 14:
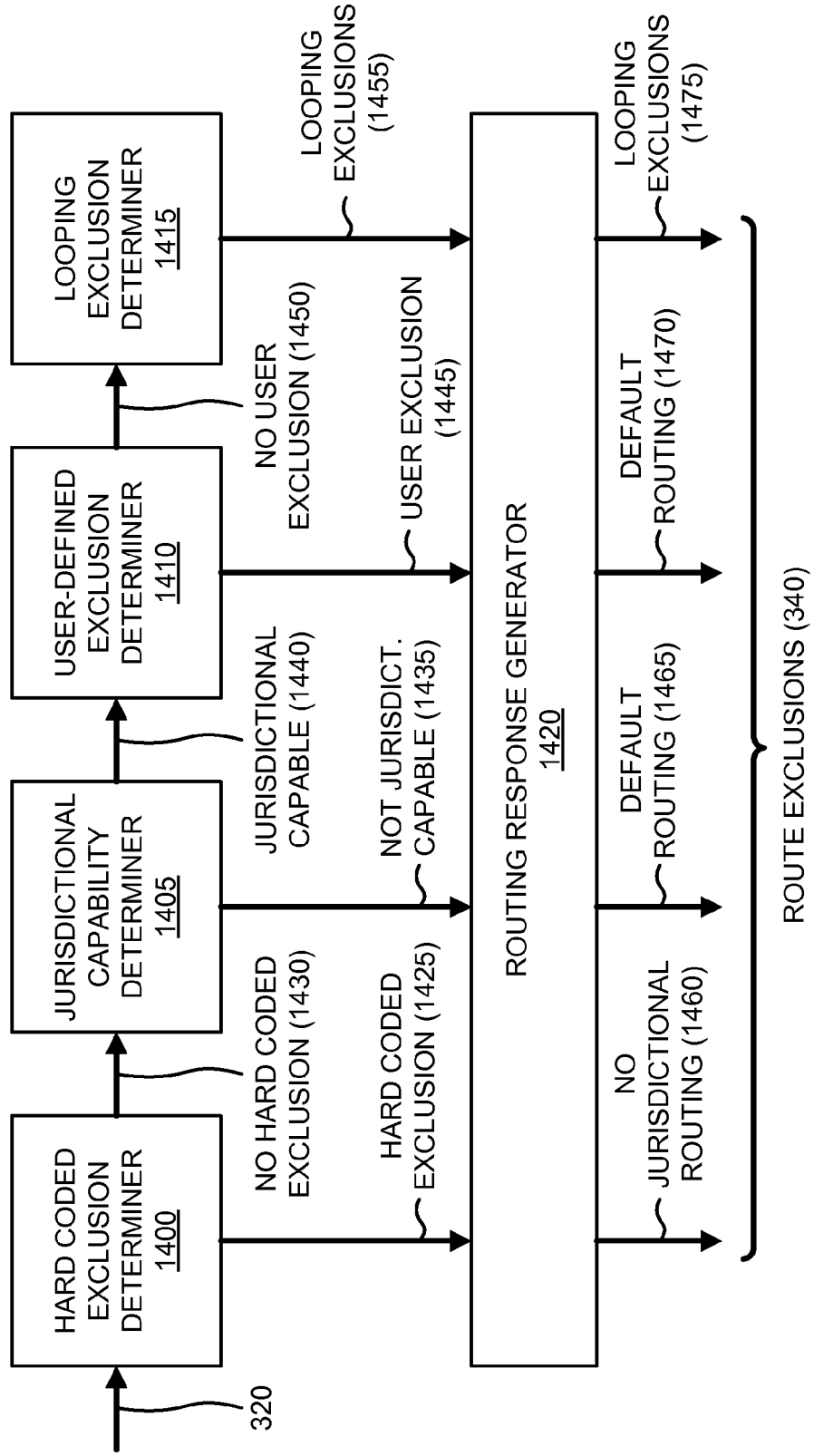
FIG. 14 illustrates a diagram of exemplary functional components of the route excluder depicted in FIG. 1.

FIG. 14 illustrates a diagram of exemplary functional components of route excluder 140. As illustrated, route excluder 140 may include a hard coded exclusion determiner 1400, a jurisdictional capability determiner 1405, a user-defined exclusion determiner 1410, a looping exclusion determiner 1415, and a routing response generator 1420. The functions described in FIG. 14 may be performed by one or more of the exemplary components of device 200 depicted in FIG. 2.

Hard coded exclusion determiner 1400 may include any hardware or combination of hardware and software that may receive call information 320, and may determine whether call information 320 is associated with a hard coded (or pre-defined) exclusion (e.g., special services requiring on-net only terminations, etc.). If hard coded exclusion determiner 1400 determines that call information 320 is associated with a hard coded exclusion, hard coded exclusion determiner 1400 may provide an indication 1425, to routing response generator 1420, that call information 320 is associated with a hard coded exclusion. If hard coded exclusion determiner 1400 determines that call information 320 is not associated with a hard coded exclusion, hard coded exclusion determiner 1400 may provide an indication 1430, to jurisdictional capability determiner 1405, that call information 320 is not associated with a hard coded exclusion.

Jurisdictional capability determiner 1405 may include any hardware or combination of hardware and software that may receive indication 1430 and call information 320, and may determine whether call information 320 is capable of jurisdictional routing based on the call destination or other criteria. If jurisdictional capability determiner 1405 determines that call information 320 is not capable of jurisdictional routing, jurisdictional capability determiner 1405 may provide an indication 1435, to routing response generator 1420, that call information 320 is not capable of jurisdictional routing. If jurisdictional capability determiner 1405 determines that call information 320 is capable of jurisdictional routing, jurisdictional capability determiner 1405 may provide an indication 1440, to user-defined exclusion determiner 1410, that call information 320 is capable of jurisdictional routing.

User-defined exclusion determiner 1410 may include any hardware or combination of hardware and software that may receive indication 1440 and call information 320, and may determine whether call information 320 is associated with a user-defined exclusion (e.g., a user-defined exclusion from jurisdictional routing). If user-defined exclusion determiner 1410 determines that call information 320 is associated with a user-defined exclusion, user-defined exclusion determiner 1410 may provide an indication 1445, to routing response generator 1420, that call information 320 is associated with a user-defined exclusion. If user-defined exclusion determiner 1410 determines that call information 320 is not associated with a user-defined exclusion, user-defined exclusion determiner 1410 may provide an indication 1450, to looping exclusion determiner 1415, that call information 320 is not associated with a user-defined exclusion.

Looping exclusion determiner 1415 may include any hardware or combination of hardware and software that may receive indication 1450 and call information 320, and may determine whether call information 320 is associated with a looping condition exclusion. If looping exclusion determiner 1415 determines that call information 320 is associated with a looping condition exclusion, looping exclusion determiner 1415 may provide an indication 1455, to routing response generator 1420, that call information 320 is associated with a looping condition exclusion.

Routing response generator 1420 may include any hardware or combination of hardware and software that may receive one of indications 1425, 1435, 1445, or 1455, and may generate a routing response based on the received one of indications 1425, 1435, 1445, or 1455. For example, if routing response generator 1420 receives indication 1425, routing response generator 1420 may generate a response 1460 indicating that call 310 may not be jurisdictionally routed. If routing response generator 1420 receives indication 1435 or indication 1445, routing response generator 1420 may generate responses 1465 or 1470 indicating that call 310 should be routed using default routing. If routing response generator 1420 receives indication 1455, routing response generator 1420 may generate a response 1475 indicating that call 310 should be routed to avoid looping conditions. Responses 1460-1475 may correspond to route exclusions 340, described above in connection with FIG. 3.

Although FIG. 14 shows exemplary functional components of route excluder 140, in other implementations, route excluder 140 may contain fewer, different, differently arranged, or additional functional components than depicted in FIG. 14. In still other implementations, one or more functional components of route excluder 140 may perform one or more other tasks described as being performed by one or more other functional components of route excluder 140.

FIGS. 15-19B depict flow charts of an exemplary process 1500 for jurisdictionally optimized call routing according to implementations described herein. In one implementation, process 1500 may be performed by INCP 130. In another implementation, some or all of process 1500 may be performed by another device or group of devices, including or excluding INCP 130.

Figure 15:
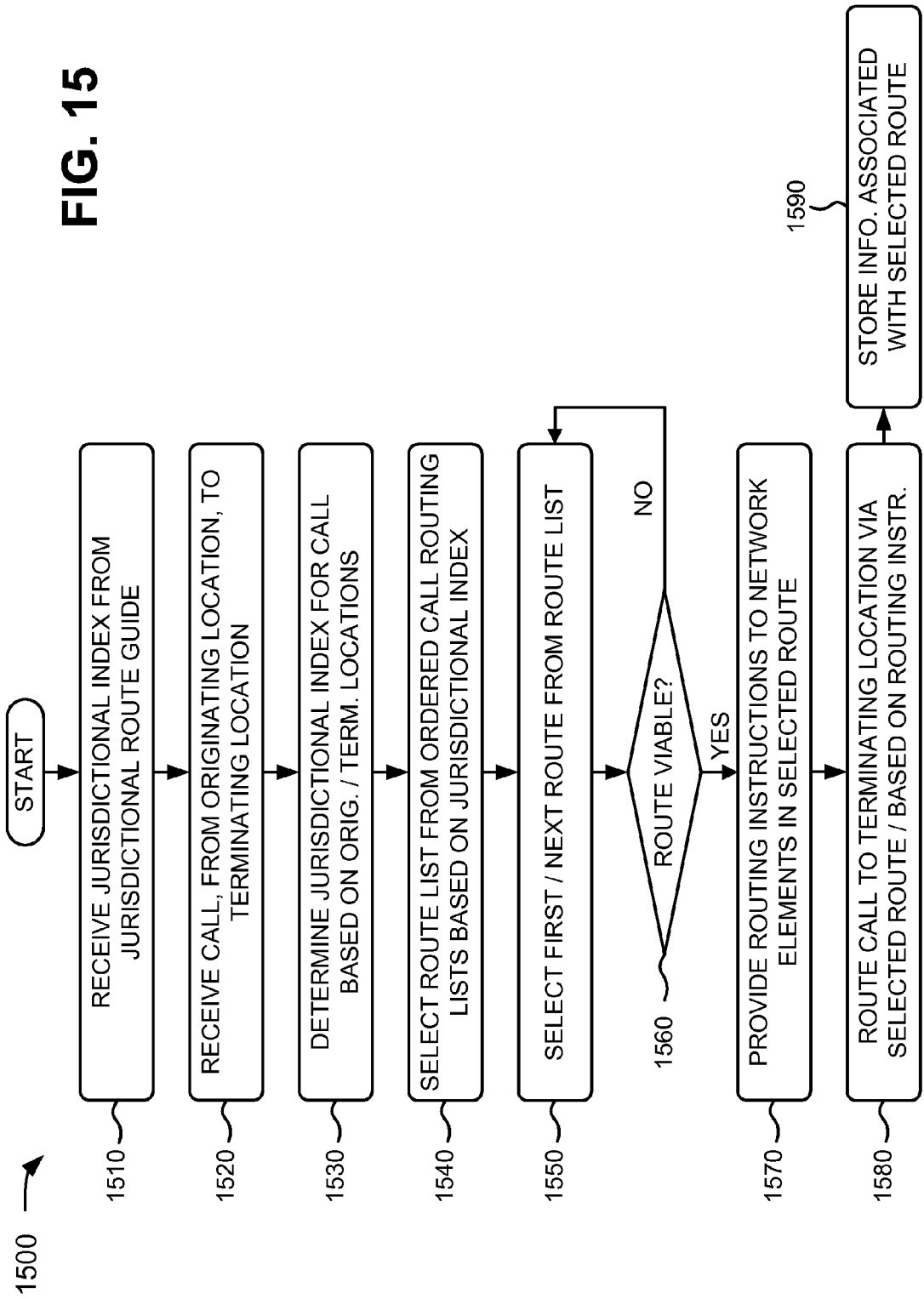

As illustrated in FIG. 15, process 1500 may begin with receipt of a jurisdictional index table (e.g., that includes ordered call routing lists) from a jurisdictional route guide (block 1510), and receipt of information about a call, from an originating location, to a terminating location (block 1520). For example, in implementations described above in connection with FIG. 3, if a calling party places call 310 (e.g., via originating user device 110) to a called party (e.g., associated with terminating user device 110), INCP 130 may receive call information 320 about call 310. INCP 130 may also receive jurisdictional index table 330 from jurisdictional route guide 120. Jurisdictional index table 330 may include call routing information (e.g., path information, carrier information, network element information, etc.) for every potential jurisdictional index to every potential destination associated with network 100. In one example, jurisdictional route guide 120 may periodically calculate and/or provide jurisdictional index table 330 to INCP 130 at a predetermined time intervals (e.g., weekly, monthly, etc.).

As further shown in FIG. 15, a jurisdictional index may be determined for the call based on the originating and terminating locations and in accordance with carrier call origination definitions (block 1530), and a route list may be selected from the ordered route list based on the jurisdictional index and the terminating location (block 1540). For example, in implementations described above in connection with FIG. 3, prior to allowing call 310 to connect to terminating user device 110, INCP 130 may analyze call 310 and may determine whether a jurisdictionally optimal route (e.g., that minimizes costs paid to carriers not associated with a carrier associated with INCP 130) can be utilized for routing call 310. INCP 130 may determine a jurisdictional index for call 310 based on the locations of originating and terminating user devices 110. INCP 130 may select a route list for call 310 from jurisdictional index table 330 based on the determined jurisdictional index.

Returning to FIG. 15, a first (or next) route may be selected from the route list (block 1550), and it may be determined whether the selected route is viable (block 1560). For example, in implementations described above in connection with FIG. 3, INCP 130 may select a first route from the route list, and may determine if the selected route is viable (e.g., available, not excluded, etc.). Route excluder 140 may receive call information 320 from INCP 130, and may determine route exclusions 340 based on call information 320. Route excluder 140 may provide route exclusions 340 to INCP 130, and INCP 130 may exclude the determined routes provided in route exclusions 340 when determining a route for call 310.

As further shown in FIG. 15, if the selected route is not viable (block 1560—NO), a next route may be selected from the route list (block 1550). If the selected route is viable (block 1560—YES), routing instructions may be provided to network elements provided in the selected route (block 1570), the call may be routed to the terminating location, via the selected route and based on the routing instructions (block 1580), and information associated with the selected route may be stored (block 1590). For example, in implementations described above in connection with FIG. 3, if the selected route is not viable, INCP 130 may select a next route from the route list. If the selected route is viable, INCP 130 may provide routing instructions 350 to network elements (e.g., network elements 170) in the selected route, may route call 310 to terminating user device 110, via the selected route (e.g., via network elements 170) and based on routing instructions 350, and may store route information 360 (e.g., associated with the selected route) in database 135. Routing instructions 350 may include information that instructs network elements 170 on how to route call 310 to terminating user device 110. Routing instructions 350 may include path information that identifies which components (e.g., switches, trunks, etc.) of network elements 170 that may be used to provide an end-to-end path between originating user device 110 and terminating user device 110. Route information 360 may include information associated with call 310 (e.g., call date, dialed number, called number, unmarked call, marked call, etc.), the selected route (e.g., originating switch, originating trunk, terminating trunk, etc.), routing instructions 350, the selected route list from jurisdictional index table 330, etc.

Figure 16:
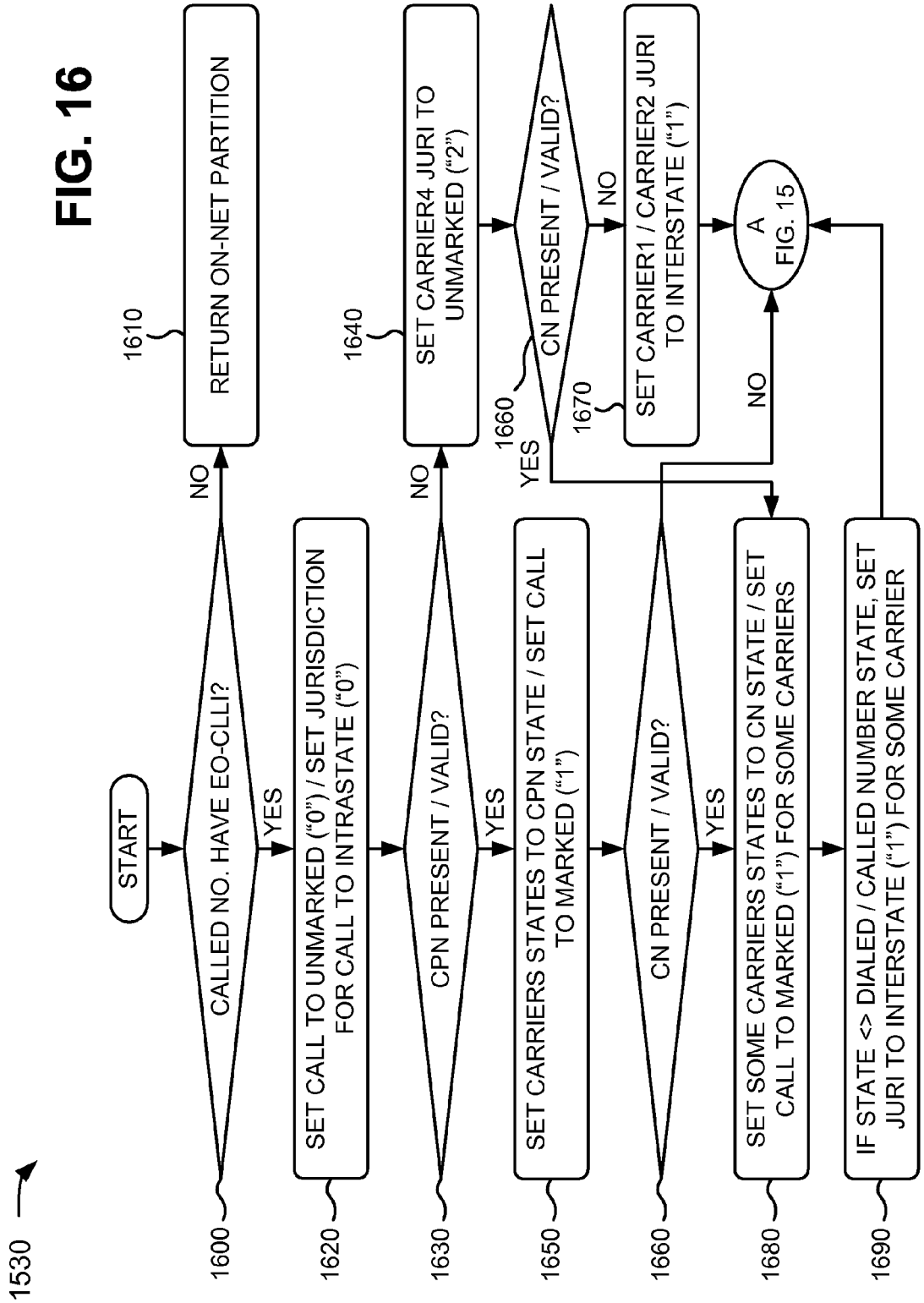

Process block 1530 may include the process blocks depicted in FIG. 16. As shown in FIG. 16, process block 1530 may include determining whether a called number of the call has an EO-CLLI code for which routing orders for each possible jurisdictional index have been calculated (block 1600). If the called number does not have an EO-CLLI code for which routing orders for each possible jurisdictional index have been calculated (block 1600—NO), an on-net partition may be returned (block 1610). Otherwise (block 1600—YES), the call may be set to unmarked and the jurisdiction for the call may be set to intrastate (block 1620). For example, in implementations described above in connection with FIG. 10, EO-CLLI determiner 1000 determine whether a called number (e.g., of call 310) has an EO-CLLI code in jurisdictional index table 800 and whether the EO-CLLI is enabled. If the called number does not have an EO-CLLI in jurisdictional index table 800 or the EO-CLLI is not enabled, EO-CLLI determiner 1000 may provide indication 1050 that EO-CLLI is not in jurisdictional index table 800 or the EO-CLLI is not enabled, and an on-network partition may be returned, as indicated by reference number 1055. If the called number has an EO-CLLI in jurisdictional table 800 and the EO-CLLI is enabled, EO-CLLI determiner 1000 may provide indication 1060, to unmarked/jurisdiction setter 1005, indicating that the EO-CLLI is in jurisdictional table 800 and is enabled. Unmarked/jurisdiction setter 1005 may receive indication 1060 from EO-CLLI determiner 1000, may set call 310 to unmarked (e.g., "0") for the carriers associated with network 100, and may set the jurisdiction for call 310 to intrastate (e.g., "0") for the carriers associated with network 100.

As further shown in FIG. 16, process block 1530 may include determining whether a calling party number (CPN) of the call is present and valid (block 1630). If the calling party number of the call is not present or is invalid (block 1630—NO), a jurisdiction for the call may be set to unmarked for a carrier (e.g., "Carrier4") (block 1640). Otherwise (block 1630—YES), states for carriers may be set to a calling party number state and the call may be set to marked (block 1650). For example, in implementations described above in connection with FIG. 10, CPN determiner 1010 may determine whether a calling party number (CPN) associated with call 310 is present and valid. If the CPN associated with call 310 is not present or is invalid, CPN determiner 1010 may provide indication 1065, to jurisdiction setter 1015, indicating that the CPN associated with call 310 is not present or is invalid. If the CPN associated with call 310 is present and valid, CPN determiner 1010 may provide indication 1080, to state/marked setter 1030, indicating that the CPN associated with call 310 is present and valid. Jurisdiction setter 1015 may receive indication 1065, and may set a jurisdiction for call 310 to unmarked for a particular carrier based on indication 1065. State/marked setter 1030 may receive indication 1080 from CPN determiner 1010, may set a state for carriers associated with network 100 to a state of the CPN associated with call 310, and may set call 310 to marked (e.g., "1") for some of the carriers based on indication 1080.

Returning to FIG. 16, process block 1530 may include determining whether a charge number (CN) of the call is present and valid (block 1660) (two occurrences). If the CN of the call is not present or is invalid (block 1660—NO), a jurisdiction for particular carriers (e.g., "Carrier1" and "Carrier4") may be set to interstate (block 1670) and process block 1530 may continue to "A" in FIG. 17. Otherwise (block 1660—YES), states for some carriers may be set to a state of the CN and the call may be set to marked for some carriers (block 1680) and a jurisdiction for some carriers may be set to interstate if the carriers' state is not the same as the state associated with a called number of the call (block 1690). For example, in implementations described above in connection with FIG. 10, CN determiner 1020 may determine whether a charge number (CN) associated with call 310 is present and valid. If the CN associated with call 310 is not present or is invalid, CN determiner 1020 may provide indication 1070, to jurisdiction setter 1025, indicating that the CN associated with call 310 is not present or is invalid. If the CN associated with call 310 is present and valid, CN determiner 1020 may provide indication 1075, to state/marked setter 1040, indicating that the CN associated with call 310 is present and valid. CN determiner 1035 may determine whether a CN associated with call 310 is present and valid. If the CN associated with call 310 is present and valid, CN determiner 1035 may provide indication 1085, to state/marked setter 1040, indicating that the CN associated with call 310 is present and valid. State/marked setter 1040 may receive indication 1075 from CN determiner 1020 and may receive indication 1085 from CN determiner 1035. State/marked setter 1040 may set a state for some carriers to a state of the CN associated with call 310 and may set call 310 to marked (e.g., "1") for some carriers based on indications 1075 and/or 1085. Jurisdiction setter 1045 may set a jurisdiction for call 310 to interstate (e.g., "1") for some carriers of network 100, if the states of the carriers are not the same as the state of the called (or dialed) number associated with call 310.

As shown in FIG. 17, process block 1530 may include determining whether an ANI of the call is present and valid (block 1700). If the ANI is present and valid (block 1700—YES), the states of some carriers may be set to a state associated with the ANI and the call may be set to marked for some carriers (block 1710). For example, in implementations described above in connection with FIG. 11, ANI determiner 1100 may determine whether an ANI associated with call 310 is present and valid. If the ANI associated with call 310 is present and valid, ANI determiner 1100 may provide indication 1140, to state/marked setter 1105, indicating that the ANI associated with call 310 is present and valid. If the ANI associated with call 310 is not present or is invalid, ANI determiner 1100 may provide indication 1145, to JIP determiner 1110, indicating that the ANI associated with call 310 is not present or is invalid. State/marked setter 1105 may receive indication 1140 from ANI determiner 1100, may set a state for some carriers to a state of the ANI associated with call 310, and may set call 310 to marked (e.g., "1") for some carriers based on indication 1140.

As further shown in FIG. 17, if the ANI is not present or is invalid (block 1700—NO), it may be determined if a JIP is present and valid (block 1720). If the JIP is present and valid (block 1720—YES), a state for a carrier (e.g., "Carrier3") may be set to a state associated with the JIP and the call may be set to marked for the carrier (block 1730). For example, in implementations described above in connection with FIG. 11, JIP determiner 1110 may determine whether a JIP associated with call 310 is present and valid. If the JIP associated with call 310 is present and valid, JIP determiner 1110 may provide indication 1150, to state/marked setter 1115, indicating that the JIP associated with call 310 is present and valid. If the JIP associated with call 310 is not present or is invalid, JIP determiner 1110 may provide indication 1155, to jurisdiction setter 1130, indicating that the JIP associated with call 310 is not present or is invalid. State/marked setter 1115 may receive indication 1150 from JIP determiner 1110, may set a state for a particular carrier to a state of the JIP associated with call 310, and may set call 310 to marked (e.g., "1") for the particular carrier based on indication 1150.

Returning to FIG. 17, if the JIP is not present or is invalid (block 1720—NO), it may be determined if the called number (CN) of call terminates to an OCN where JIP is relevant (e.g. On-Net1 from FIG. 4) (block 1740). If the called number terminates to an OCN (block 1740—YES), a state for a carrier (e.g., "On-Net") may be set to a state associated with the JIP and the call may be set to marked for the carrier (block 1750) and the jurisdictional index for the call may be set to interstate for the carrier if the call is marked for the carrier and the state of the carrier is the same as the called number state (block 1760). For example, in implementations described above in connection with FIG. 11, CN to OCN determiner 1120 may determine whether the CN associated with call 310 terminates to an OCN where JIP is relevant. If the CN associated with call 310 does not terminate to the OCN, CN to OCN determiner 1120 may provide indication 1160, to jurisdictional index setter 1130, indicating that the CN associated with call 310 does not terminate to the OCN where JIP is relevant. If the CN associated with call 310 terminates to the OCN, CN to OCN determiner 1120 may provide indication 1165, to state/marked setter 1125, indicating that the CN associated with call 310 terminates to the OCN where JIP is relevant. State/marked setter 1115 may receive indication 1165 from CN to OCN determiner 1120, may set a state for a particular carrier to a state of the JIP associated with call 310, and may set call 310 to marked (e.g., "1") for the particular carrier based on indication 1165. Jurisdictional index setter 1130 may receive indication 1160 from CN to OCN determiner 1120, and may receive indication 1155 from JIP determiner 1110. Based on indications 1155 and 1160, jurisdiction setter 1130 may set a jurisdiction for call 310 to interstate (e.g., "1") for a particular carrier of network 100, if the state of the particular carrier is not the same as the state of the terminating location of call 310 and if call 310 is set to marked (e.g., "1").

As further shown in FIG. 17, if the call is unmarked for the carrier, the jurisdictional index for the call may be set to unmarked for the carrier (block 1770). Process block 1530 may continue to "B" in FIG. 18 after process block 1770. For example, in implementations described above in connection with FIG. 11, jurisdiction setter 1135 may set a jurisdiction for call 310 to unmarked (e.g., "2") for a particular carrier of network 100, if call 310 is set to unmarked (e.g., "0").

As shown in FIG. 18, process block 1530 may include determining whether the call is set to marked for a particular carrier (e.g., "Carrier3") (block 1800). If the call is set to marked for the particular carrier (block 1800—YES), the jurisdiction for the call may be set to interstate (e.g., "1") for the particular carrier if the originating state determined under the rules of the particular carrier is not the same as the state associated with the called number (block 1810). A jurisdiction for the call may be set to intrastate for another carrier (e.g., "Carrier4") if the carrier's originating state determined under that carrier's rules is the same as the state associated with the called number and the jurisdiction is not set to unmarked for the carrier (block 1820). For example, in implementations described above in connection with FIG. 12, marked call determiner 1200 may determine whether call 310 is marked or unmarked for a particular carrier. If call 310 is marked for the particular carrier, marked call determiner 1200 may provide indication 1250, to jurisdiction setter 1210, indicating that call 310 is marked for the particular carrier. If call 310 is unmarked for the particular carrier, marked call determiner 1200 may provide indication 1260, to jurisdiction setter 1230, indicating that call 310 is unmarked for the particular carrier. Jurisdiction setter 1210 may receive indication 1250 from marked call determiner 1200, and may, based on indication 1250, set a jurisdiction for call 310 to interstate (e.g., "1") for a particular carrier of network 100, if the state of the particular carrier is not the same as the state of the called number associated with call 310. Jurisdiction setter 1220 may set a jurisdiction for call 310 to interstate (e.g., "1") for a particular carrier of network 100, if the jurisdiction for call 310 (for the particular carrier) was previously set to unmarked (e.g., "2") and if the state of the particular carrier is not the same as the state of the called number associated with call 310.

As further shown in FIG. 18, if the call is not set to marked for the particular carrier (block 1800—NO), the jurisdiction for the call may be set to unmarked for the particular carrier (block 1830) and the jurisdictional index for the call may be constructed based on the jurisdiction determined for the various carriers (block 1840). For example, in implementations described above in connection with FIG. 12, jurisdiction setter 1230 may receive indication 1260 from marked call determiner 1200, and may, based on indication 1260, set a jurisdiction for call 310 to unmarked (e.g., "2") for a particular carrier of network 100. Jurisdictional index constructor 1240 may receive jurisdictions associated with the various carriers of network 100. Jurisdictional index constructor 1240 may construct jurisdictional index 940 for call 310 based on the jurisdictions.

Figure 19B:
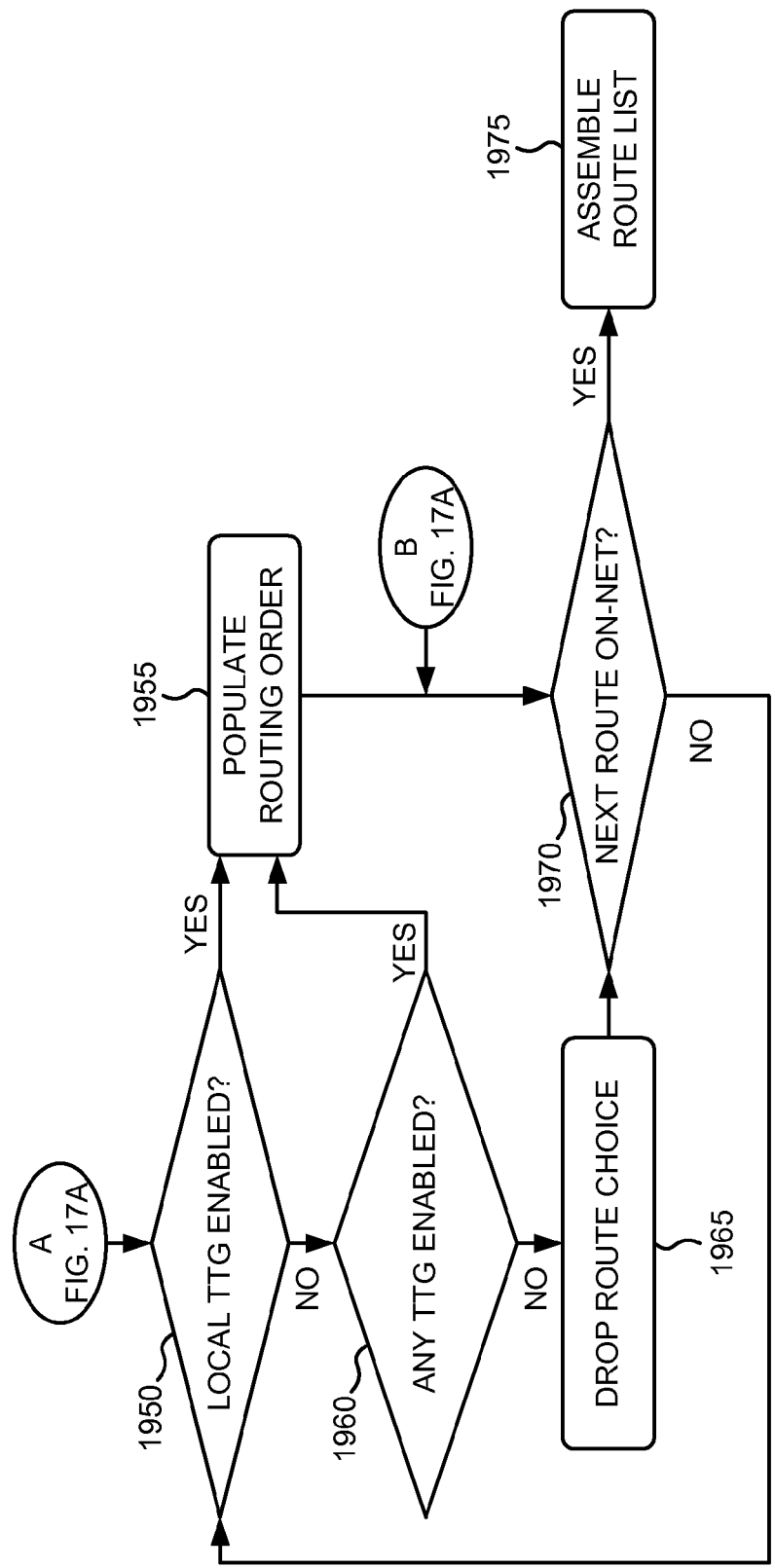

Process block 1540 may include the process blocks depicted in FIGS. 19A and 19B. As shown in FIG. 19A, if the first route is determined to be on-network (block 1900—YES), an on-network partition may be returned (block 1905). Otherwise (block 1910—NO), it may be determined if the call is considered marked by the carrier associated with the first route (block 1910). For example, in implementations described above in connection with FIG. 13, if on-net determiner 1300 of INCP 130 determines the first route to be on-network, on-net determiner 1300 may indicate that the first route is on-net 1340, may determine that the first route is one of viable/least expensive routes 960, and may end the process. If on-net determiner 1300 determines the first route to not be on-network, on-net determiner 1300 may provide an indication 1345, to marked call determiner 1305, that the first route in not on-network.

As further shown in FIG. 19A, if the call is considered marked by the carrier associated with the first route (block 1910—YES), process block 1540 may continue to "A" in FIG. 19B. Otherwise (block 1910—NO), it may be determined if the carrier geocodes unmarked calls (block 1915). If the carrier does not geocode unmarked calls (block 1915—

NO), it may be determined if the unmarked call threshold would be exceeded for the carrier (block 1920) If the unmarked call threshold would be exceeded for the carrier (block 1920—YES), the route choice may be dropped from consideration (block 1925). Otherwise (block 1920—NO), process block 1540 may continue to "A" of FIG. 19B. For example, in implementations described above in connection with FIG. 13, if marked call determiner 1305 determines that the carrier associated with the first route considers call 310 to be an unmarked call, marked call determiner 1305 may provide indication 1350, to geocode determiner 1310, that call 310 is an unmarked call. If marked call determiner 1305 determines that the carrier associated with the first route considers call 310 to be a marked call, marked call determiner 1305 may provide indication 1355, to switch/trunk determiner 1325, that call 310 is a marked call. If geocode determiner 1310 determines that the carrier associated with the first route does not geocode unmarked calls, geocode determiner 1310 may provide indication 1360, to unmarked threshold determiner 1320, that call 310 is not geocoded. If unmarked threshold determiner 1320 determines that the carrier associated with the first route would exceed an unmarked call threshold if call 310 is routed by the carrier, unmarked threshold determiner 1320 may provide indication 1380, to route eliminator 1330, that the unmarked call threshold would be exceeded by the carrier. If unmarked threshold determiner 1320 determines the carrier associated with the first route would not exceed an unmarked call threshold if call 310 is routed by the carrier, unmarked threshold determiner 1320 may provide indication 1385, to switch/trunk determiner 1325, that the unmarked call threshold would not be exceeded by the carrier.

Returning to FIG. 19A, if the carrier does geocode unmarked calls (block 1915—YES), it may be determined if the jurisdiction is intrastate (e.g., "0") (block 1930). If the jurisdiction is not intrastate (block 1930—NO), it may be determined if the carrier has a trunk ("TTG") to a state different than the state of the originating switch (block 1935). Otherwise (block 1930—YES), it may be determined if the carrier has a trunk considered to offer intrastate termination (e.g. the terminating trunk group is associated with a state equal to the state of the call location for unmarked calls) (block 1940). If the carrier has a trunk route to the interstate/intrastate terminating location (blocks 1935 and 1940—YES), the routing order (or list) may be populated with the route choice (block 1945) and process block 1540 may proceed to "B" in FIG. 19B. For example, in implementations described above in connection with FIG. 13, if geocode determiner 1310 determines that the carrier associated with the first route geocodes unmarked calls, geocode determiner 1310 may provide indication 1365, to interstate call determiner 1315, that call 310 is geocoded. If interstate call determiner 1315 determines the carrier associated with the first route provides a carrier route to the terminating location of call 310, interstate call determiner 1315 may provide indication 1375, to routing list determiner 1335, that the carrier provides a carrier route for call 310. If switch/trunk determiner 1325 determines the carrier associated with the first route has switch(es)/trunk(s) that are able to route call 310 to the terminating location, switch/trunk determiner 1325 may provide indication 1395, to routing list determiner 1335, that the carrier has switch(es)/trunk(s) that are able to route call 310.

As further shown in FIG. 19A, if the carrier does not have a trunk route associated with the interstate/intrastate terminating location (blocks 1935 and 1940—NO), the route choice may be dropped (block 1925). For example, in implementations described above in connection with FIG. 13, if interstate call determiner 1315 determines that the carrier associated with the first route does not provide a carrier route to the terminating location of call 310, interstate call determiner 1315 may provide indication 1370, to route eliminator 1330, that the carrier does not provide a carrier route for call 310. If switch/trunk determiner 1325 determines that the carrier associated with the first route does not have switch(es)/trunk(s) that are able to route call 310 to the terminating location, switch/trunk determiner 1325 may provide an indication 1390, to route eliminator 1330, that the carrier does not have switch(es)/trunk(s) that are able to route call 310. Route eliminator 1330 may eliminate the first route of selected route list 950 as a possible path for routing call 310 based on one of indications 1370, 1380, or 1390.

As shown in FIG. 19B, it may be determined whether the carrier associated with the route choice has an enabled trunk (TTG) located on the originating switch (TSID=OSID) (block 1950). If so (block 1950—YES), the routing order (or list) may be populated with the route choice (block 1955). Otherwise (block 1950—NO), it may be determined whether the enabled TTG is associated with the OSID, even if on another switch (block 1960). If the enabled TTG is associated with the OSID (block 1960—YES), the routing order (or list) may be populated with the route choice (block 1955). Otherwise (block 1960—NO), the route choice may be dropped (block 1965) and it may be determined whether a next route on the route list is on-network (block 1970). If the next route is on-network (block 1970—YES), the route list may be assembled (block 1975). Otherwise (block 1970—NO), process block 1950 may return to block 1950.

For example, in implementations described above in connection with FIG. 13, if interstate call determiner 1315 determines the carrier associated with the first route provides a carrier route to the terminating location of call 310, interstate call determiner 1315 may provide indication 1375, to routing list determiner 1335, that the carrier provides a carrier route for call 310. If switch/trunk determiner 1325 determines the carrier associated with the first route has switch(es)/trunk(s) that are able to route call 310 to the terminating location, switch/trunk determiner 1325 may provide indication 1395, to routing list determiner 1335, that the carrier has switch(es)/trunk(s) that are able to route call 310. Routing list determiner 1335 may determine a list of one or more viable/least expensive routes 960 based on one of indications 1375 or 1395. If interstate call determiner 1315 determines that the carrier associated with the first route only provides a carrier terminating trunk group having the same geocoded state as the state of the originating location of call 310, interstate call determiner 1315 may provide indication 1370, to route eliminator 1330, that the carrier does not provide a carrier route for call 310. If switch/trunk determiner 1325 determines that the carrier associated with the first route does not have switch(es)/trunk(s) that are able to route call 310 to the terminating location, switch/trunk determiner 1325 may provide an indication 1390, to route eliminator 1330, that the carrier does not have switch(es)/trunk(s) that are able to route call 310. Route eliminator 1330 may eliminate the first route of selected route list 950 as a possible path for routing call 310 based on one of indications 1370, 1380, or 1390. The process blocks depicted in FIGS. 19A and 19B may be repeated for one or more of the routes provided in the selected route list.

Systems and/or methods described herein may provide jurisdictionally optimized call routing in a least expensive manner. For example, in one implementation, the systems and/or methods may receive ordered call routing lists from a jurisdictional route guide, and may receive a call, from an originating location, to a terminating location. The systems and/or methods may determine a jurisdictional index for the call based on the originating and terminating locations, and may select a route list for the call from the ordered call routing lists based on the jurisdictional index. The systems and/or methods may select a first route from the route list, and may determine if the selected route is viable. If the selected route is not viable, the systems and/or methods may select a next route from the route list. If the selected route is viable, the systems and/or methods may provide routing instructions to network elements in the selected route, may route the call to the terminating location, via the selected route and based on the routing instructions, and may store information associated with the selected route.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 13-19B, the order of the blocks may be modified in other implementations. Further, non-dependent blocks may be performed in parallel.

It will be apparent that aspects, as described herein, may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware may be designed to implement these aspects based on the description herein.

Further, certain portions of the invention may be implemented as "logic" that performs one or more functions. This logic may include hardware, such as an application specific integrated circuit or a field programmable gate array, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "tone" or similar language is used. Further, the phrase "based on" is intended to mean "based, at least in part, on" unless explicitly stated otherwise.

What is claimed is:

1. A method comprising:
    receiving, by a computing device that includes a processor, call routing lists;
    receiving, by the computing device, information about a call between an originating location of a network and a terminating location of the network;
    determining, by the computing device, a jurisdictional index for the call based on the originating location, the terminating location, and jurisdiction definitions of carriers associated with the network,
        the jurisdictional index including an identifier that corresponds to first information that indicates that the call is designated as an intrastate call by a first carrier of the carriers associated with the network and to second information that indicates that the call is designated as an interstate call by a second carrier of the carriers associated with the network;
    selecting, by the computing device, a particular route list from the call routing lists based on the identifier;
    selecting, by the computing device, a route from the particular route list; and
    providing, by the computing device, routing instructions to network elements associated with the route,
        the call being routed to the terminating location via the network elements associated with the route and based on the routing instructions.

2. The method of claim 1, where providing the routing instructions includes:
    determining that the route is available for routing the call; and
    providing the routing instructions to the network elements associated with the route after determining that the route is available.

3. The method of claim 1, where selecting the route includes:
    selecting a different route from the particular route list;
    determining that the different route is unavailable for routing the call; and
    selecting the route from the particular route list after determining that the different route is unavailable.

4. The method of claim 1, further comprising:
    determining the routing instructions based on the route.

5. The method of claim 1, further comprising:
    storing, in a storage device of the computing device, information associated with the route.

6. The method of claim 5, where the information associated with the route comprises one or more of:
    information associated with the call,
    information associated with the network elements,
    information associated with the routing instructions, or
    information associated with the particular route list.

7. The method of claim 1, where the call routing lists are ordered based on jurisdictional information associated with the network.

8. The method of claim 7, where the jurisdictional information is based on how the carriers, associated with the network, determine jurisdictions for calls.

9. The method of claim 1,
    where the particular route list includes a list of potential routes, for the call, that are ranked based on cost, and
    where selecting the route includes:
        selecting the route based on a ranking of the route in the list of potential routes.

10. The method of claim 1,
    where the identifier further corresponds to third information that indicates that the call is designated as an unmarked call by a third carrier of the carriers associated with the network, and
    where the particular route list is selected from the call routing lists further based on one or more of:
        whether the third carrier geocodes unmarked calls,
        whether routing the call using the third carrier will cause the third carrier to exceed an unmarked call threshold, or
        whether, for geocoded calls, the third carrier has trunk group interconnections on the network.

11. The method of claim 1, where the jurisdictional index for the call is determined further based on one or more of:
    whether the call is a marked call or an unmarked call,
    whether a valid calling party number is associated with the call,
    whether a valid charge number is associated with the call, whether a valid automatic number identification (ANI) is associated with the call, or whether a valid Jurisdiction Information Parameter (JIP) code is associated with the call and the call is a mobile call.

12. The method of claim 1, where the computing device comprises an intelligent call processing platform (INCP).

13. A device comprising:
a memory to store call routing lists; and
one or more processors to:
receive information about a call that is from an originating location of a network and to a terminating location of the network,
determine a jurisdictional index for the call based on the originating location, the terminating location, and jurisdiction definitions of carriers associated with the network,
the jurisdictional index including an identifier that corresponds to first information that indicates that the call is designated as an intrastate call by a first carrier of the carriers associated with the network and to second information that indicates that the call is designated as an interstate call by a second carrier of the carriers associated with the network,
select a particular route list from the call routing lists based on the identifier,
select a route from the particular route list,
determine routing instructions for network elements associated with the route, and
provide the routing instructions to the network elements associated with the route,
the call being routed to the terminating location via the route and based on the routing instructions.

14. The device of claim 13, where the device includes an intelligent call processing platform (INCP).

15. The device of claim 13, where, when providing the routing instructions, the one or more processors are to:
determine that the route is available for routing the call, and
provide the routing instructions to the network elements associated with the route after determining that the route is available.

16. The device of claim 13, where, when selecting the route, the one or more processors are to:
select a different route from the particular route list,
determine that the different route is unavailable for routing the call, and
select the route from the particular route list after determining that the different route is unavailable.

17. The device of claim 13, where, when determining the jurisdictional index for the call, the one or more processors are to:
determine that the call is designated as the interstate call by the second carrier based on the originating location and the terminating location or based on geocoding, and
determine that the call is designated as the intrastate call by the first carrier based on the originating and terminating locations or based on geocoding.

18. The device of claim 13, where the one or more processors are further to:
store, in the memory, information associated with the selected route.

19. The device of claim 18, where the information associated with the selected route comprises one or more of:
information associated with the call,
information associated with the network elements,
information associated with the routing instructions, or
information associated with the particular route list.

20. The device of claim 13,
where the call routing lists are ordered based on jurisdictional information that includes carrier costs for all possible jurisdictional indices,
the all possible jurisdictional indices including the jurisdictional index.

21. The device of claim 20, where the jurisdictional information is based on how the carriers, associated with the network, determine jurisdictions for calls.

22. The device of claim 13,
where the particular route list includes a list of potential routes, for the call, that are ranked based on cost, and
where, when selecting the route, the one or more processors are to:
select the route based on a ranking of the route in the list of potential routes.

23. The device of claim 13, where the jurisdictional index for the call is determined further based on one or more of:
whether the call is a marked call or an unmarked call,
whether a valid calling party number is associated with the call,
whether a valid charge number is associated with the call,
whether a valid automatic number identification (ANI) is associated with the call, or
whether a valid Jurisdiction Information Parameter (JIP) code is associated with the call and the call is a mobile call.

24. The device of claim 13,
where the identifier further corresponds to third information that indicates that the call is designated as an unmarked call by a third carrier of the carriers associated with the network, and
where the particular route list is selected from the call routing lists further based on one or more of:
whether the third carrier geocodes unmarked calls,
whether routing the call by the third carrier will cause the third carrier to exceed an unmarked call threshold, or
whether the third carrier has network elements for routing the call to the terminating location.

25. A non-transitory computer-readable medium storing instructions, the instructions comprising:
one or more instructions that, when executed by at least one processor, cause the at least one processor to:
determine jurisdictional information for carriers associated with a network based on criteria used by the carriers to determine jurisdictions for calls;
determine carrier rate information associated with the carriers;
identify rates in the carrier rate information based on the jurisdictional information;
determine a sorting of the carriers based on the rates;
determine call routing lists based on the sorting of the carriers;
receive a call that is between an originating location and a terminating location;
determine a jurisdictional index for the call based on the originating location and the terminating location,
the jurisdictional index including an identifier that corresponds to first information that indicates that the call is designated as an intrastate call by a first carrier of the carriers associated with the network and to second information that indicates that the call is designated as an interstate call by a second carrier of the carriers associated with the network;
select a route list from the call routing lists based on the identifier;
select a route from the route list; and provide routing instructions to network elements associated with the route, the call being routed to the terminating location via the route and based on the routing instructions.

* * * * *